United States Patent
Sato

(10) Patent No.: US 9,257,850 B2
(45) Date of Patent: Feb. 9, 2016

(54) POWER TRANSMISSION APPARATUS, POWER RECEPTION APPARATUS AND POWER TRANSMISSION SYSTEM

(75) Inventor: Kazuhiro Sato, Tokyo (JP)

(73) Assignee: SONY CORPORATION, Tokyo (JP)

(*) Notice: Subject to any disclaimer, the term of this patent is extended or adjusted under 35 U.S.C. 154(b) by 762 days.

(21) Appl. No.: 12/890,232

(22) Filed: Sep. 24, 2010

(65) Prior Publication Data
US 2011/0080052 A1 Apr. 7, 2011

(30) Foreign Application Priority Data
Oct. 5, 2009 (JP) ................................. 2009-231673

(51) Int. Cl.
*H01F 27/42* (2006.01)
*H02J 5/00* (2006.01)
*H02J 17/00* (2006.01)

(52) U.S. Cl.
CPC ........ *H02J 5/005* (2013.01); *H02J 17/00* (2013.01)

(58) Field of Classification Search
CPC ........................................... H02J 5/005
USPC ................................................. 307/104
See application file for complete search history.

(56) References Cited

U.S. PATENT DOCUMENTS

| | | | | |
|---|---|---|---|---|
| 2010/0052431 | A1* | 3/2010 | Mita | 307/104 |
| 2010/0109443 | A1* | 5/2010 | Cook et al. | 307/104 |
| 2010/0127660 | A1* | 5/2010 | Cook et al. | 320/108 |

FOREIGN PATENT DOCUMENTS

| | | |
|---|---|---|
| CN | 101340113 A | 1/2009 |
| JP | 11-188113 | 7/1999 |
| JP | 2008-295191 | 12/2008 |
| JP | 2009-501510 | 1/2009 |
| WO | 2007/008646 | 1/2007 |

OTHER PUBLICATIONS

Cannon, B.L.; Hoburg, J.F.; Stancil, D.D.; Goldstein, S.C., "Magnetic Resonant Coupling As a Potential Means for Wireless Power Transfer to Multiple Small Receivers," in Power Electronics, IEEE Transactions on, vol. 24, No. 7, pp. 1819-1825, Jul. 2009.*
Chinese Office Action issued in relation to counterpart Chinese Appl No. 2010-10501199.8 dated Jun. 25, 2013.
Chinese Office Action issued in connection with related Chinese Patent Application No. 201010501199.8 dated Oct. 22, 2013.

* cited by examiner

*Primary Examiner* — Daniel Cavallari
(74) *Attorney, Agent, or Firm* — Dentons US LLP

(57) ABSTRACT

A power transmission apparatus including a power transmitting unit which includes an induction unit which receives an electrical energy from an external power source by induction and a magnetic resonance unit which transmits the electrical energy to an external receiving unit by magnetic resonance.

9 Claims, 17 Drawing Sheets

F I G . 2
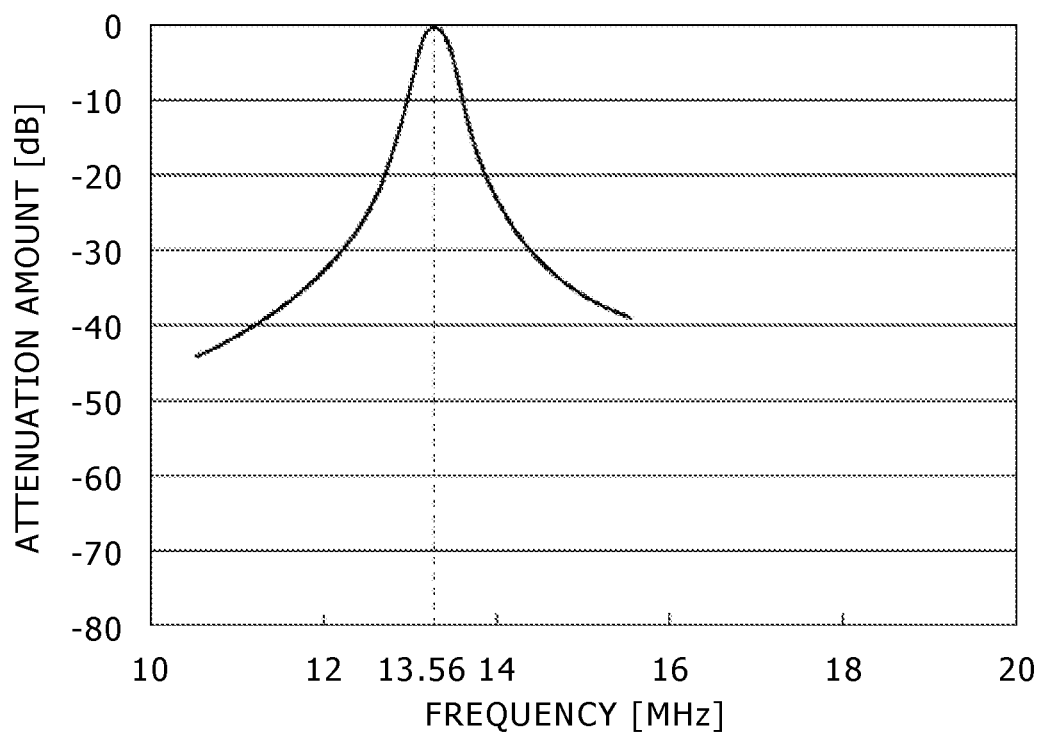

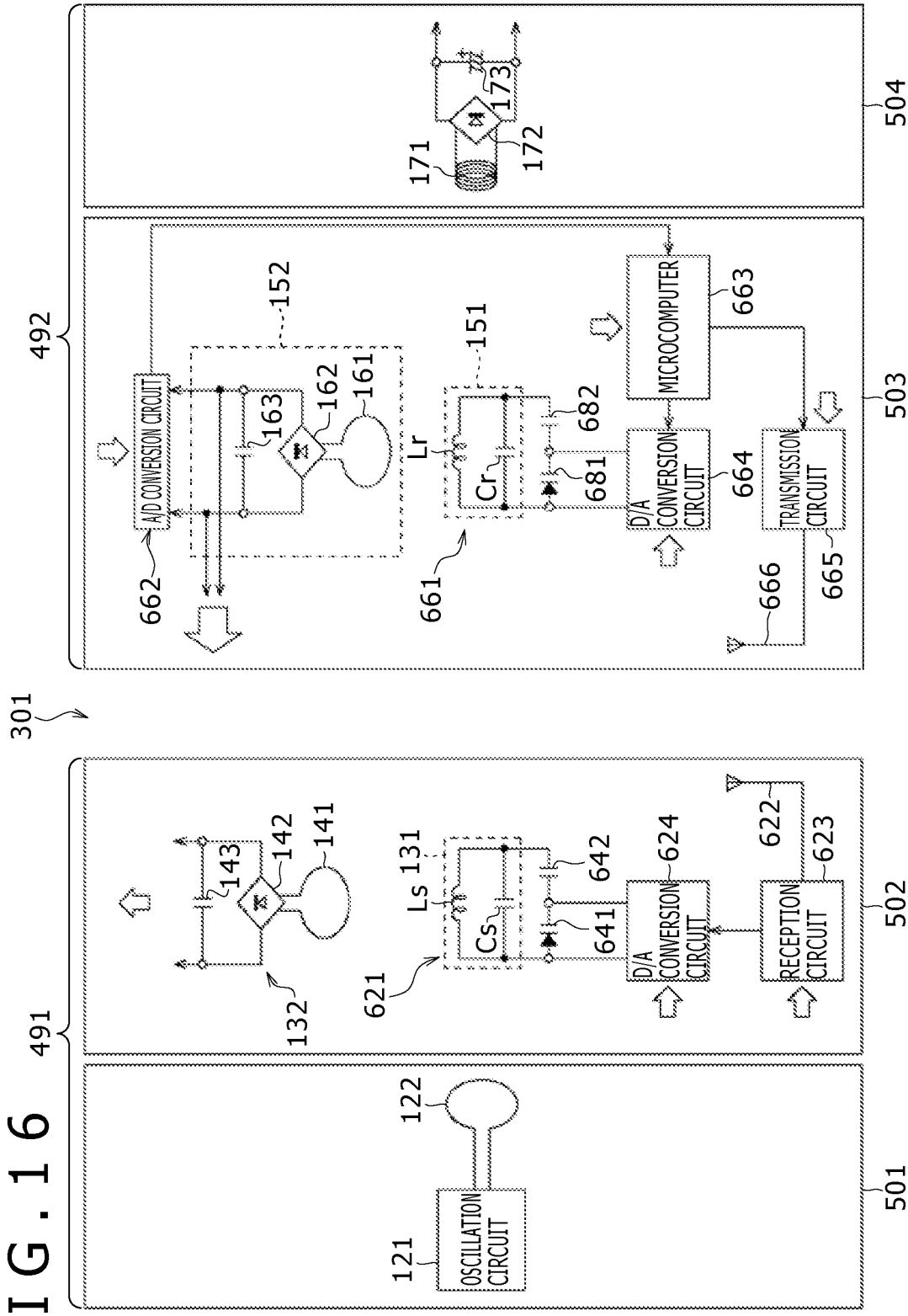

POWER TRANSMISSION APPARATUS, POWER RECEPTION APPARATUS AND POWER TRANSMISSION SYSTEM

BACKGROUND OF THE INVENTION

This invention relates to a power transmission apparatus, a power reception apparatus and a power transmission system, and particularly to a power transmission apparatus, a power reception apparatus and a power transmission system which can transmit power contactlessly in small equipment.

In recent years, research and development of a system for transmitting electric power contactlessly has been conducted. One of such systems is disclosed, for example, in Japanese Patent Laid-Open No. 2008-295191.

As a power transmission method for contact less power transmission system such as an electromagnetic induction type power transmission method is available. Further, in recent years, a power transmission method a magnetic field resonance type power transmission method has become available. The magnetic field resonance type power transmission method allows for the transmission of power over a long distance in comparison to an electromagnetic induction type power transmission method.

FIG. 1 shows an example of a configuration of an existing power transmission system to which the magnetic field resonance type power transmission method is applied.

The existing power transmission system 11 shown in FIG. 1 consists of a power transmission apparatus 21 and a power reception apparatus 22.

The power transmission apparatus 21 includes an oscillation circuit 31, a power transmission coil 32 and a resonance circuit 33 which are accommodated in a single housing 21A.

The power reception apparatus 22 includes a resonance circuit 51, a power reception coil 52, a bridge rectification circuit 53 and a smoothing capacitor 54 which are accommodated in a single housing 22A.

The existing power transmission system 11 having such a configuration as described above operates in the following manner.

In particular, alternating current outputted from the oscillation circuit 31 flows to the power transmission coil 32, and as result, an oscillating electromagnetic field is generated around the power transmission coil 32. Alternating current is induced by the oscillating electromagnetic field of the power transmission coil 32 and flows to the resonance circuit 33 on the power transmission side, and as a result, an oscillating electromagnetic field having a predetermined resonance frequency is generated around the resonance circuit 33 on the power transmission side.

The resonance circuit 51 on the power reception side of the power reception apparatus 22, alternating current flows by resonance of the oscillating electromagnetic field of the resonance circuit 33 on the power transmission apparatus 21 side. In particular, wireless non-radiation type energy transfer is carried out using an electromagnetic field mode of oscillation resonance so that alternating current flows to the resonance circuit 51 on the power reception side. As a result, an oscillating electromagnetic field having a predetermined resonance frequency is generated around the resonance circuit 51 on the power reception side. Alternating current is induced by the oscillating electromagnetic field of the resonance circuit 51 on the power reception side and flows to the power reception coil 52. This alternating current is full-wave rectified by the bridge rectification circuit 53. The full-wave rectified current in the form of pulsating current is smoothed by the smoothing capacitor 54 and then supplied to a circuit on the following stage not shown.

In this manner, in the existing power transmission system 11, power is supplied contactlessly from the power transmission apparatus 21 to the power reception apparatus 22.

Incidentally, in such a magnetic field resonance type power transmission method applied to the existing power transmission system 11 as described above, if the Q value of the resonance circuit is not raised, then the transmission efficiency cannot be enhanced. In particular, in the example of FIG. 1, in order to enhance the transmission efficiency, it is necessary to set the Q value of the resonance circuit 33 on the power transmission side and the resonance circuit 51 on the power reception side to a high value.

It is to be noted that, since, with such a frequency as is utilized in the magnetic field resonance type power transmission method, the Q value of the resonance circuit depends upon a characteristic of a coil, the Q value is calculated in accordance with the following expression (1):

$$Q = \omega \frac{L}{R} \tag{1}$$

where $\omega$ is the angular frequency, L the inductance value of the coil of the resonance circuit and R the resistance value of the resonance circuit.

FIG. 2 illustrates an example of variation of the transmission efficiency of power by the magnetic field resonance type power transmission method.

In FIG. 2, the axis of ordinate indicates an attenuation amount [dB] with respect to a maximum transmission efficiency. The attenuation amount represents a transmission efficiency. The axis of abscissa indicates an oscillation frequency [MHz] of the oscillation circuit (in the example of FIG. 1, the oscillation circuit 31) on the power transmission side.

It is to be noted that, in one embodiment of FIG. 2, the resonance frequency is 13.56 MHz of the ISM (Industrial, Scientific, Medical) band. In another embodiment of FIG. 2, the resonance frequency is set to 120 kHz. Further, in the example of FIG. 2, a very high value of approximately 400 is adopted as both Q values.

As shown in FIG. 2, where the oscillation frequency is 13.56 MHz which is equal to that of the resonance frequency, the transmission efficiency is highest and the attenuation amount is zero.

However, it is difficult to apply the existing power transmission system 11 as a power supply to small equipment such as a portable telephone set, an electronic notebook, a headphone, a music player and the like.

In particular, such small equipment frequently is used at a place spaced from a power supply by several meters or more. As a result, efficient power transmission at a transmission distance of several meters or more is required for the existing power transmission system 11. In order to satisfy the request just described where the existing power transmission system 11 wherein 13.56 MHz described above is used as the resonance frequency is applied, it is necessary to increase the diameter of the coils of the resonance circuit 33 on the power transmission side and the resonance circuit 51 on the power reception side to approximately 0.44 m. It is very difficult to accommodate such a large coil having a diameter of approximately 0.44 m as just described in the inside of a small equipment.

Therefore, it is desirable to implement contact less electric power transmission in a small equipment.

SUMMARY OF THE INVENTION

In an embodiment of the present invention, there is provided a power transmission apparatus comprising a power transmitting unit which includes (1) an induction unit which receives an electrical energy from an external power source by induction and (2) a magnetic resonance unit which transmits the electrical energy to an external receiving unit by magnetic resonance.

Another embodiment consistent with the present invention provides the power transmission apparatus further comprising a power supply unit in the power transmission unit which receives the electrical energy from the external power source by induction and provides electrical energy to a plurality of electrical devices in the power transmission unit.

Another embodiment consistent with the present invention provides the power transmission system where the external power source is an oscillation unit which generates an electromagnetic field which is induced by the induction unit in the power transmitting unit.

Another embodiment consistent with the present invention provides the power transmission system wherein the oscillation unit is separated from the power transmission unit by a distance.

Another embodiment consistent with the present invention provides the power transmission system wherein the magnetic resonance unit includes a transmission coil having a diameter of 0.44 m or less.

Another embodiment consistent with the present invention provides the power transmission system wherein the magnetic resonance unit generates an electromagnetic wave having a wavelength of 13.56 MHz.

Another embodiment consistent with the present invention provides the power transmission system wherein the magnetic resonance unit generates an electromagnetic wave having a wavelength of 120 kHz.

Another embodiment consistent with the present invention provides a power receiving apparatus comprising a power receiving unit which includes (1) a magnetic resonance unit that receives an electrical energy from an external source by magnetic resonance and (2) an induction unit which transmits the electrical energy to an external reception unit by induction.

Another embodiment consistent with the present invention provides the power receiving apparatus further comprising a power supply unit in the power receiving unit which receives electrical energy from the induction unit and provides electrical energy to a plurality of electrical devices in the power receiving unit.

Another embodiment consistent with the present invention provides the power receiving apparatus wherein the power receiving unit is separated from the external reception unit by a distance.

Another embodiment consistent with the present invention provides the power receiving apparatus wherein the magnetic resonance unit includes a transmission coil having a diameter of 0.44 m or less.

Another embodiment consistent with the present invention provides the power receiving apparatus wherein the magnetic resonance unit generates an electromagnetic wave having a wavelength of 13.56 MHz.

Another embodiment consistent with the present invention provides the power receiving apparatus wherein the magnetic resonance unit generates an electromagnetic wave having a wavelength of 120 kHz.

Another embodiment consistent with the present invention provides a power transmission system comprising a power transmitting unit which includes (1) an induction unit which receives an electrical energy from an external power source by induction and (2) a magnetic resonance transmitting unit which transmits the electrical energy by magnetic resonance, a power receiving unit which includes (1) a magnetic resonance receiving unit that receives the electrical energy from the power transmission unit by magnetic resonance and (2) an induction unit which transmits the electrical energy to an external reception unit by induction.

Another embodiment consistent with the present invention provides the power transmission system wherein the power transmitting unit is separated from the power receiving unit by a distance.

Another embodiment consistent with the present invention provides the power transmission system wherein the external power source is separated from power transmitting unit by a distance.

Another embodiment consistent with the present invention provides the power transmission system wherein the external reception unit is separated from the power receiving unit by a distance.

Another embodiment consistent with the present invention provides the power transmission system wherein the magnetic resonance transmission unit generates an electromagnetic wave having a wavelength of 13.56 MHz.

Another embodiment consistent with the present invention provides the power transmission system wherein the magnetic resonance transmission unit generates an electromagnetic wave having a wavelength of 120 kHz.

Another embodiment consistent with the present invention provides the power transmission system wherein the distance between the power transmission unit and the power receiving unit is 2.2 m or less.

Another embodiment consistent with the present invention provides the power transmission system wherein the magnetic resonance receiving unit includes a coil having a diameter of 0.44 m or less.

Another embodiment consistent with the present invention provides the power transmission system wherein the magnetic resonance transmitting unit includes a coil having a diameter of 0.44 m or less.

Another embodiment consistent with the present invention provides an electronic apparatus comprising a reception coil in the electronic apparatus in inductive communication with a magnetic resonance receiving unit via an electromagnetic field. Where the magnetic resonance receiving unit receives a magnetic resonance energy and converts the magnetic resonance energy into the electromagnetic field.

Another embodiment consistent with the present invention provides the electronic apparatus wherein the magnetic resonance energy is generated from a magnetic resonance unit separated from the magnetic resonance receiving unit by a distance.

Another embodiment consistent with the present invention provides the electronic apparatus wherein the distance is 2.2 m or less.

Another embodiment consistent with the present invention provides the electronic apparatus wherein the reception unit is separated from the magnetic resonance receiving unit by a distance.

BRIEF DESCRIPTION OF THE DRAWINGS

FIG. 2 is a diagram illustrating on embodiment of variation of the transmission efficiency of power by the magnetic field resonance type power transmission method consistent with the present invention;

FIG. 16 is a block diagram showing one configuration of a power transmission system which is consistent with the present invention;

DETAILED DESCRIPTION OF THE PREFERRED EMBODIMENTS

The embodiments of the present invention are described below with reference to the drawings.

Figure 3:
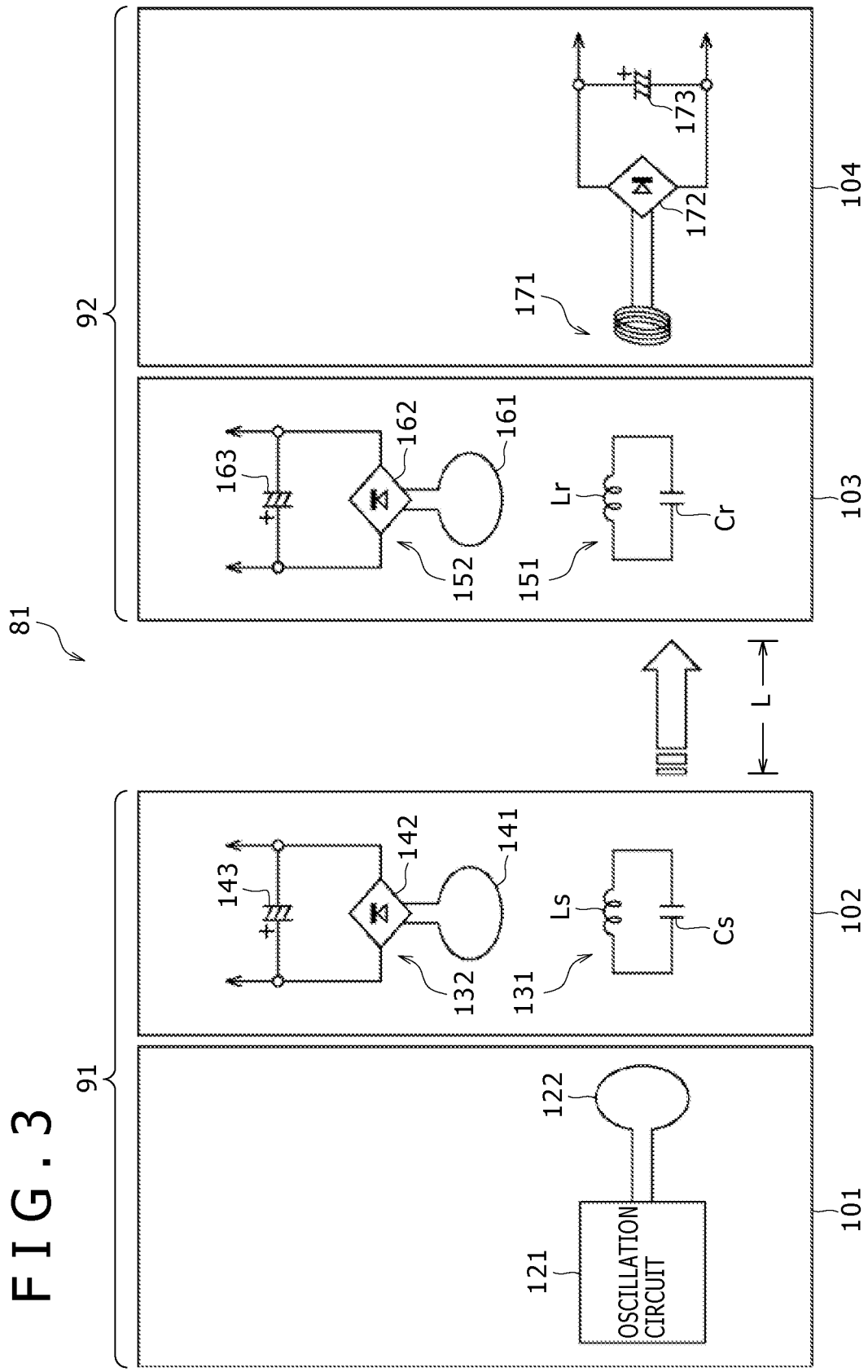
FIG. 3 depicts a block diagram showing one configuration of a power transmission system consistent with the present invention.

Referring first to FIG. 3, there is shown a configuration of the power transmission system according to the first embodiment of the present invention.

The power transmission system 81 shown is configured from a power transmission apparatus 91 and a power reception apparatus 92. The power transmission apparatus 91 and the power reception apparatus 92 are disposed physically separately from each other in a spaced relationship by a distance L.

The power transmission apparatus 91 is configured from a unit 101 having a single housing and another unit 102 having a single housing. The unit 101 and the unit 102 can be physically separated from each other, and are disposed, where power is to be transmitted to the power reception apparatus 92, in a contacting relationship with each other or in a spaced relationship from each other by a distance of approximately several cm.

The unit 101 is configured from an oscillation circuit 121 as an oscillation section and a power transmission coil 122 connected to the oscillation circuit 121.

Meanwhile, the unit 102 is configured from a power transmission side resonance circuit 131 as a resonance section and a unit power supply circuit 132 as a power supplying section. The power transmission side resonance circuit 131 is configured from a coil having an inductance Ls and a capacitor having a capacitance Cs. While a capacitor having a predetermined value may be connected as the capacitor of the capacitance Cs, the capacitance Cs may be provided as stray capacitance formed by disposing end portions of the coil in a spaced relationship by a predetermined distance from each other and in an opposing relationship to each other. The unit power supply circuit 132 is configured from a coil 141, a bridge rectification circuit 142 and a smoothing capacitor 143. The bridge rectification circuit 142 is connected to the coil 141. The smoothing capacitor 143 is connected to both of output terminals of the bridge rectification circuit 142. A member for which power is required such as an LED (Light Emitting Diode) or a lamp not shown is connected across the smoothing capacitor 143.

The power reception apparatus 92 is configured from a unit 103 having a single housing and another unit 104 having a single housing. The unit 103 and the unit 104 can be physically separated from each other, and are disposed, where power is to be received from the power transmission apparatus 91, in a contacting relationship with each other or in a spaced relationship from each other by a distance of approximately several cm.

The unit 103 is configured from a power reception side resonance circuit 151 as a resonance section and a unit power supply circuit 152 as a power supplying section. The power reception side resonance circuit 151 is configured from a coil having an inductance Lr and a capacitor having a capacitance Cr. While a capacitor having a predetermined value may be connected as the capacitor of the capacitance Cr, the capacitance Cr may be provided as stray capacitance formed by disposing end portions of the coil in a spaced relationship by a predetermined distance from each other and in an opposing relationship to each other. The unit power supply circuit 152 is configured from a coil 161, a bridge rectification circuit 162 and a smoothing capacitor 163. The bridge rectification circuit 162 is connected to the coil 161. The smoothing capacitor 163 is connected to both terminals of outputs of the bridge rectification circuit 162. A member for which power is required such as an LED or a lamp not shown is connected across the smoothing capacitor 163.

The unit 104 is configured from a power reception coil 171, a bridge rectification circuit 172 and a smoothing capacitor 173. The bridge rectification circuit 172 is connected to the power reception coil 171. The smoothing capacitor 173 which configures a power supplying section together with the bridge rectification circuit 172 is connected to both of output terminals of the bridge rectification circuit 172. A member for which power is required such as a charging circuit for a small equipment is connected across the smoothing capacitor 173.

It is to be noted that, taking a comparatively high frequency of alternating current to be applied to the bridge rectification circuits into consideration, the bridge rectification circuits 142, 162 and 172 in the present embodiment are configured individually from a fast recovery diode. Further, the smoothing capacitors 143, 163 and 173 in the present embodiment are configured individually from an electrolytic capacitor.

The power transmission system 81 having such a configuration as described above operates in the following manner.

In particular, in the power transmission apparatus 91, if the oscillation circuit 121 of the unit 101 starts oscillation operation, then the oscillation circuit 121 outputs alternating current having a predetermined frequency f121 (hereinafter referred to as oscillation frequency f121). The alternating current outputted from the oscillation circuit 121 flows to the power transmission coil 122, and as a result, an oscillating electromagnetic field of the oscillation frequency f121 is generated around the power transmission coil 122. In other words, the oscillating electromagnetic field of the oscillation frequency 121 is generated around the unit 101.

Alternating current flows to the power transmission side resonance circuit 131 of the unit 102 disposed in the proximity of the unit 101 by induction by the oscillating electromagnetic field around the unit 101. As a result, an oscillating electromagnetic field of a resonance frequency f121 represented by the an expression (2) given below is generated around the power transmission side resonance circuit 131. In particular, an equivalent circuit of the power transmission side resonance circuit 131 is an LC circuit configured from an inductance LS of a coil and a stray capacitance Cs as illustrated in FIG. 3. In this instance, the resonance frequency f131 of the power transmission side resonance circuit 131 is given to the following expression (2):

$$f_{131} = \frac{1}{2\pi\sqrt{LsCs}} \quad (2)$$

In the power reception apparatus 92, alternating current flows to the power reception side resonance circuit 151 of the unit 103 by resonance of the oscillating electromagnetic field of the power transmission side resonance circuit 131 of the unit 102 on the power transmission apparatus 91 side. In particular, radio non-radiation type energy transfer is carried out using an electromagnetic field mode of oscillation resonance so that the alternating current flows to the power reception side resonance circuit 151. As a result, an oscillating electromagnetic field having a resonance frequency f151 represented by an expression (3) given below is generated around the power reception side resonance circuit 151. In particular, an equivalent circuit of the power reception side resonance circuit 151 is an LC circuit configured from an inductance Lr of a coil and a stray capacitance Cr as seen in FIG. 3. In this instance, the resonance frequency f151 of the power reception side resonance circuit 151 is represented by the following expression (3):

$$f_{151} = \frac{1}{2\pi\sqrt{LrCr}} \quad (3)$$

It is to be noted that ideally the resonance frequency f131 on the power transmission side and the resonance frequency f151 on the power reception side are both equal to the oscillation frequency f121 of the oscillation circuit 121. Here, the reason why the term [ideally] is used is that there is the possibility that the resonance frequencies f131 and f151 may be displaced from the oscillation frequency f121 caused by variation of the use environment during actual use.

The oscillating electromagnetic field is generated around the power reception side resonance circuit 151, that is, around the unit 103 of the power reception apparatus 92 in such a manner as described above. Then, in the unit 104, alternating current flows to the power reception coil 171 by induction by the oscillating electromagnetic field. The alternating current is subjected to full-wave rectification carried out by the bridge rectification circuit 172. The full-wave rectified current in the form of pulsating current is smoothed by the smoothing capacitor 173, and the resulting current is supplied to a part for which power is required such as a charging circuit for a small apparatus not shown or the like.

In the power transmission system 81, power is supplied contactlessly to the power reception apparatus 92 by resonance of the magnetic field from the power transmission apparatus 91 in this manner.

Further, power is supplied from the unit power supply circuit 132 to parts in the unit 102 of the power transmission apparatus 91. In particular, alternating current flows to the coil 141 by induction by the oscillating electromagnetic field generated around the power transmission coil 122 of the unit 101 and the power transmission side resonance circuit 131 of the unit 102. The alternating current is subjected to full-wave rectification carried out by the bridge rectification circuit 142. The full-wave rectified current in the form of pulsating current is smoothed by the smoothing capacitor 143 into direct current and then supplied to the parts not shown in the unit 102. The parts in the unit 102 may be, for example, an LED and a lamp. In this instance, the LED or the lamp can be turned on with the power supplied from the unit power supply circuit 132 to indicate that, for example, the unit 102 or the power transmission system 81 is operating.

Similarly, power is supplied from the unit power supply circuit 152 to parts in the unit 103 of the power reception apparatus 92. In particular, alternating current flows to the coil 161 by induction by the oscillating electromagnetic field generated around the power reception side resonance circuit 151. The alternating current is subjected to full-wave rectification carried out by bridge rectification circuit 162. The full-wave rectified current in the form of pulsating current is smoothed by the smoothing capacitor 163 into direct current and then is supplied to the parts not shown in the unit 103. The parts in the unit 103 may be, for example, an LED and a lamp. In this instance, the LED or the lamp can be turned on with the power supplied from the unit power supply circuit 152 to indicate that, for example, the unit 103 or the power transmission system 81 is operating.

Since the unit power supply circuit 132 of the unit 102 and the unit power supply circuit 152 of the unit 103 are used as power supplies for internal parts of the unit 102 and the unit 103 in this manner, they can be omitted where such parts do not exist.

Incidentally, in the magnetic resonance type power transmission technique applied to the power transmission system 81, from a point of view of the transmission efficiency, the ratio of the wavelength λ of an electromagnetic wave to be transmitted, the distance between the power transmission side and the power reception side, and the diameter of the coils of the transmission side and the reception side preferably has a value approximately 50: a value lower than 5:1. Such a ratio as just given is hereinafter referred to as ideal ratio.

In particular, for example, if the transmission frequency is 13.56 MHz of the ISM band, then since the wavelength λ is determined as λ=300/13.56=22 m, preferably the distance between the transmission side and the reception side is set to 2.2 or less and the diameter of the coils is set to 0.44 m. It is to be noted that the numerical values determined from the ideal ratio are ideal values, and the transmission efficiency sometimes drops by some fluctuation of the values.

In this manner, for example, where the magnetic resonance type power transmission technique is applied to power transmission for a small apparatus, if a distance of a value around 2.2 m is assured as the distance between the transmission side and the reception side and a coil having a diameter of approximately 0.44 m is adopted, then wireless power transmission can be implemented.

Figure 1:
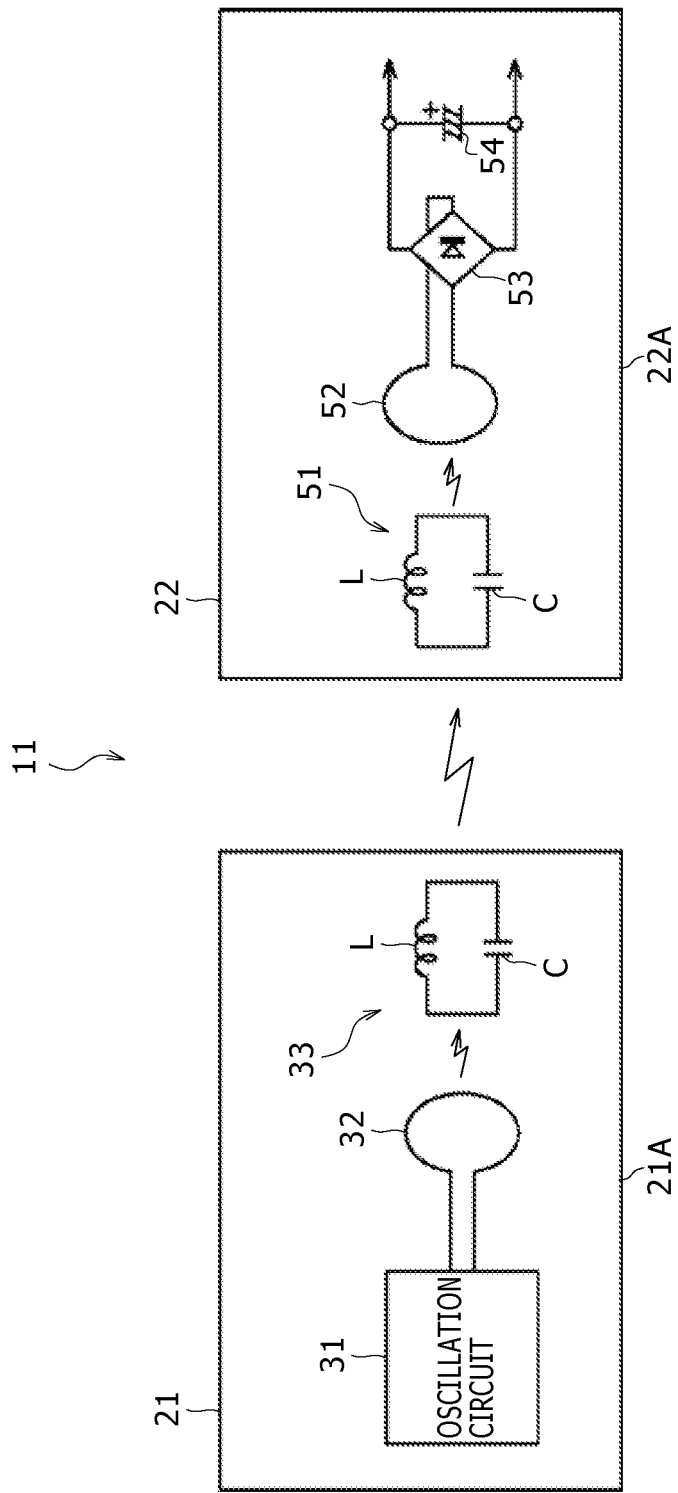
FIG. 1 is a block circuit diagram showing an one configuration of an existing power transmission system consistent with the present invention.

The assurance itself of the distance of approximately 2.2 m is possible not only with the power transmission system 81 of the present embodiment but also with the existing power transmission system 11. However, the power reception apparatus 22 of the existing power transmission system 11 of FIG. 1 is accommodated in a single housing and cannot be separated. Accordingly, to adopt a coil having a diameter of approximately 0.44 m signifies to set the diameter of the coil of the reception side resonance circuit 51 or the power reception coil 52 to approximately 0.44 m, that is, to make the size of the power reception apparatus 22 greater than that of a circle of the diameter of 0.44 m. It is very difficult to build the power reception apparatus 22 having such a great size as just described in a small-sized apparatus. This applies not only to power transmission to a small-sized apparatus but also to contactless charging of an electronic automobile or the like. In other words, it is difficult to adopt the existing power transmission system 11 for an application to power transmission to a small-sized apparatus or contactless charging of an electric automobile or the like.

In contrast, in the power transmission system 81 of the present embodiment, the unit 103 and the unit 104 which compose the power reception apparatus 92 are physically separable from each other as described above. Accordingly, if the diameter of the coil of the power reception side resonance circuit 151 in the unit 103, that is, of the coil which forms the reactance Lr, is set to 0.44 m, then it is possible to make the diameter of the power reception coil 171 in the unit 104 much smaller than 0.44 m. In other words, it is possible to form the unit 104 in a small size. Accordingly, it can be achieved readily to incorporate the unit 104 of the small size in a small-sized apparatus or in an apparatus for contactless charging such as an electric automobile. Furthermore, also it is possible, for example, to incorporate the bridge rectification circuit 172 and the smoothing capacitor 173 in a housing of a small-sized apparatus and dispose the power reception coil 171 outside the housing of the small-sized apparatus without the provision of a housing for exclusive use for the unit 104.

In the following, various apparatus to which the power transmission system 81 of the present invention is applied are described with reference to FIGS. 4 to 15B.

[Example of the Configuration of Apparatus to which the Power Transmission System of an Embodiment of the Invention is Applied]

Figure 4:
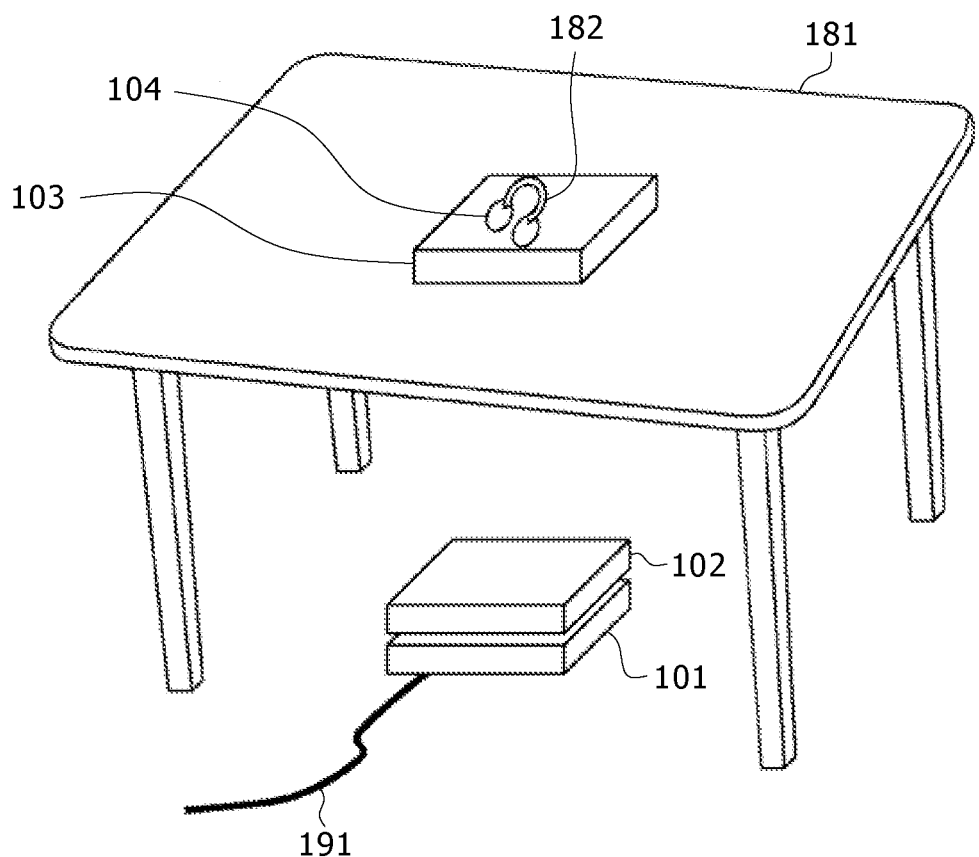
FIG. 4 depicts a schematic view showing one configuration of an application of the power transmission system.

FIG. 4 shows an example of a configuration where the power transmission system 81 of the present invention is applied to a headphone.

It is to be noted that the headphone 182 must only have a function of being mounted on the head of a user and outputting sound to an ear of the user and is not particularly restricted in terms of the type, shape and so forth. For example, the headphone may be a wireless headphone, a noise cancellation headphone or the like.

In the example shown in FIG. 4, of the units 101 to 104 which configure the power transmission system 81, the units 101 to 103 are accommodated in respective housings for exclusive use while the unit 104 is accommodated in the headphone 182. The housings of the units 101 to 103 should be formed from a material having a low dielectric constant such as a plastics material. Though not shown, a charging circuit for the headphone 182 is connected across the smoothing capacitor 173 of the unit 104. In other words, the power transmission system 81 is adopted as a charging power supply for the headphone 182.

The unit 101 and the unit 102 are laminated in order from below and disposed on the ground below a table 181. The unit 103 is disposed on an upper face of the table 181 spaced by approximately 1 m upwardly from the upper face of the housing of the unit 102. In other words, the distance L between the unit 102 and the unit 103 is approximately 1 m, and a distance equal to or smaller than 2.2 m of the preferred distance between the transmission side and the reception side calculated using the ideal ratio is assured. The headphone 182 in which the unit 104 is built can be carried freely by the user, and if there is the necessity for charging, then the user would place the headphone 182 on the unit 103.

An external power supply 191 is used as the power supply for the unit 101. In particular, the oscillation circuit 121 in the unit 101 is driven by the power supply from the external power supply 191. Though not shown, for example, in the present embodiment, a one-turn coil having a diameter of 0.44 m is adopted as the power transmission coil 122.

Figure 5:
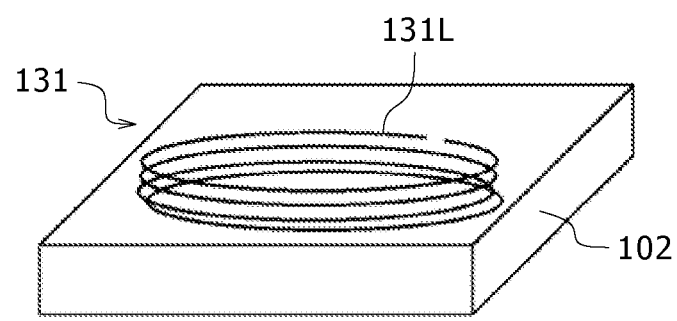
FIG. 5 depicts a schematic view showing one configuration of a unit used in the power transmission system consistent with the present invention.

FIG. 5 shows an appearance configuration of the unit 102 shown in FIG. 4. For the convenience of illustration, the unit 102 is shown such that the coil 131L therein can be observed. The coil 131L which configures the power transmission side resonance circuit 131 of the unit 102 is formed, for example, in the present embodiment, as a five-turn coil having an air-core coil structure and having the preferred diameter of 0.44 m determined from the ideal ratio. Further, a terminal end of the coil 131L is opened to form a stray capacitance Cs. As a result, the resonance frequency f131 becomes 13.56 MHz. In this manner, the preferred diameter of 0.44 m determined from the ideal ratio is assured by the diameter of the coil 131L on the transmission side.

Though not shown, the unit 103 has a structure similar to that of the unit 102 shown in FIG. 4. The coil which is a component of the power reception side resonance circuit 151 of the unit 103 is, for example, in the present embodiment, a 5-turn coil having an air-core structure and having the preferred diameter of 0.44 m determined from the ideal ratio. Further, the coil is open at a terminal end thereof to produce stray capacitance Cr, and as a result, the resonance frequency f151 is 13.56 MHz. In this manner, the preferred diameter of 0.44 m determined from the ideal ratio is assured also by the diameter of the coil on the reception side.

Figure 6:
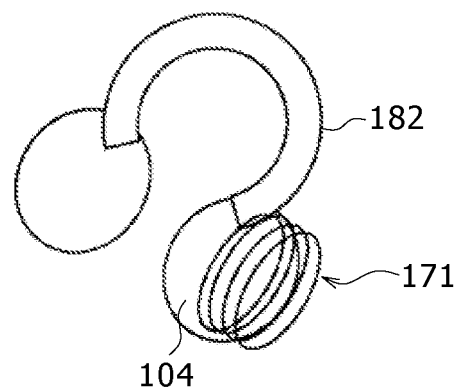
FIG. 6 depicts a schematic view showing an one configuration of a headphone in which the unit is incorporated consistent with the present invention.

FIG. 6 shows an example of a configuration of the headphone 182 which incorporates the unit 104. Though not shown, the bridge rectification circuit 172 and the smoothing capacitor 173 are built in the headphone 182 while the power reception coil 171 is built in one of enclosures. For the convenience of illustration, the power reception coil 171 is shown projecting to the outside of the enclosure. The power reception coil 171 is, for example, in the present embodiment, a 20-turn coil of a diameter of 4 cm. The reason why the diameter of the power reception coil 171 on the unit 104 side can be made small in this manner is that the unit 103 can assure the preferred coil diameter of 0.44 m calculated using the ideal ratio. In other words, the power reception coil 171 is not limited to that described above only if it can be built in the headphone 182 and has a size with which it can be charged from the power reception side resonance circuit 151 of the unit 103.

Figure 7:
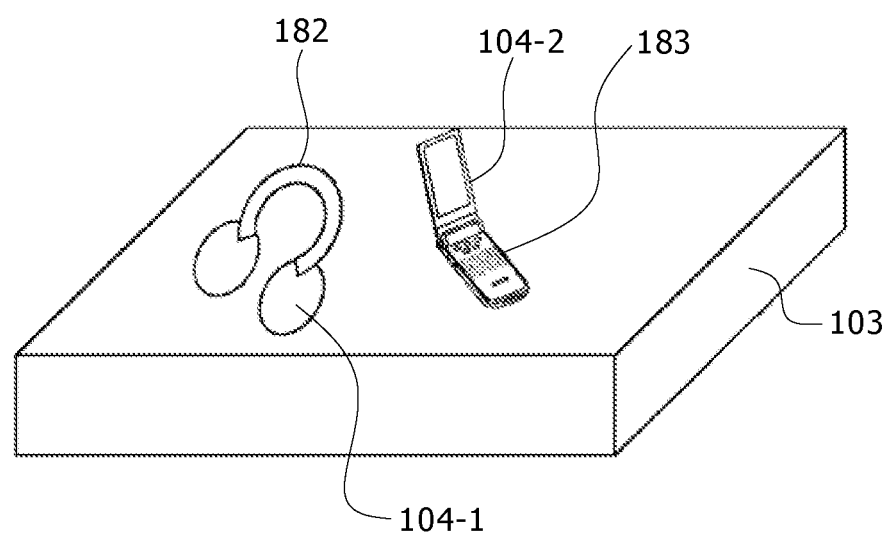
FIG. 7 depicts a schematic view showing one configuration an application of the power transmission system consistent with the present invention.

FIG. 7 shows another example of an application of the power transmission system 81 of the present invention.

It is to be noted that, in order to clearly indicate a difference, the unit 104 incorporated in the headphone 182 is hereinafter referred to particularly as unit 104-1 and the unit 104 incorporated in a portable telephone set 183 is hereinafter referred to particularly as unit 104-2.

The unit 104-1 has a configuration similar to that of the unit 104 described hereinabove with reference to FIGS. 4 to 6 and is incorporated in the headphone 182. Accordingly, overlapping description of the unit 104-1 is omitted herein to avoid redundancy.

The unit 104-2 is incorporated in the portable telephone set 183. Though not shown, a charging circuit of the portable telephone set 183 is connected across the smoothing capacitor 173 of the unit 104-2. In other words, the power transmission system 81 is adopted as a charging power supply for the headphone 182 and the portable telephone set 183.

The portable telephone set 183 in which the unit 104-2 is built can be carried freely by the user. When it is necessary to charge the portable telephone set 183, the user would place the portable telephone set 183 on the unit 103.

In the example of FIG. 7, the headphone 182 which has the unit 104-1 built therein and the portable telephone set 183 which has the unit 104-2 built therein are placed simultaneously on the upper face of the unit 103. In such an instance as just described, the headphone 182 and the portable telephone set 183 can receive power transmitted from the power transmission apparatus 91 through the units 103 and 104, respectively. Consequently, the headphone 182 and the portable telephone set 183 placed on the upper face of the housing of the unit 103 are charged by the power transmission system 81.

In this manner, the unit 103 can relay power transmitted from the power transmission apparatus 91 to a plurality of units 104 disposed around the housing thereof.

Figure 8:
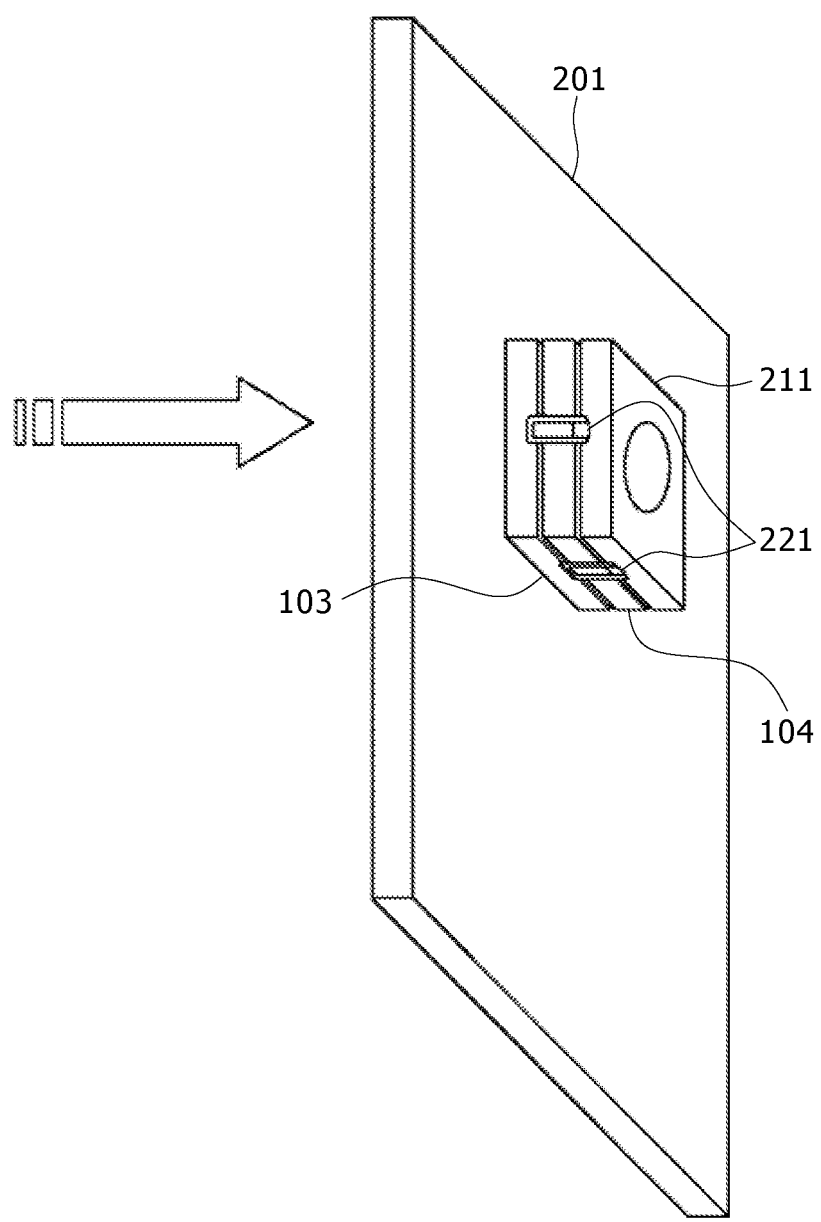
FIG. 8 depicts a schematic view showing one configuration of a wireless speaker to which the power transmission system is applied which is consistent with the present invention.

FIG. 8 shows an example of a configuration of a wireless speaker to which the power transmission system 81 according to an embodiment of the present invention is applied.

Referring to FIG. 8, in the example shown, the units 101 to 104 which configure the power transmission system 81 are accommodated in respective housings for exclusive use. The housings for the units 101 to 104 are preferably made of a material having a low dielectric constant such as a plastics material. Though not shown, the opposite terminals of the smoothing capacitor 173 of the unit 104 are used as output terminals of the units 101 to 104, and power supply terminals such as a power supply plug socket of a wireless speaker 211 are connected to the output terminals. In other words, the power transmission system 81 is adopted as a power supply for the wireless speaker.

In the example shown in FIG. 8, the unit 103 and the unit 104 as well as the wireless speaker 211 are laminated in order from the location nearest to a wall face of a wall 201 of a room, that is, in the rightward direction in FIG. 4. The unit 103, unit 104 and wireless speaker 211 are removably fastened to each other by fixing members 221 serving as fastening means such as hooks mounted for pivotal motion for locking by grooves or projections.

In the example shown in FIG. 8, though not shown, the unit 102 and the unit 101 are secured to a face of the wall 201 opposite to the face of the wall 201 on which the unit 103 and the unit 104 are secured, for example, to a wall face of a neighboring room. The unit 102 and the unit 101 are laminated in order from the location nearest to the opposite face of the wall 201, that is, in the leftward direction in FIG. 8.

The distance L between the unit 102 and the unit 103 substantially coincides with the thickness of the wall 201. Accordingly, where the wall 201 has a general thickness, a distance equal to or smaller than 2.2 m suitable as a distance between the transmission side and the reception side calculated using the ideal ratio can be assured as the distance L.

The unit 103 and the unit 104 which configure the power reception apparatus 92 can be physically separated from each other, and the unit 104 is provided independently of the wireless speaker 211. Accordingly, the user can remove the fixing members 221 as occasion demands to individually separate the unit 103, unit 104 and wireless speaker 211 from each other. Further, while, in the present embodiment, transmission of power from the unit 104 to the wireless speaker 211 is carried out by direct connection between the output terminals of the unit 104 and the power supply terminals of the wireless speaker 211, it is not particularly limited to the connection of the present embodiment. For example, contacts of the conductive fixing members 221 may be used to transmit power from the unit 104 to the wireless speaker 211.

Figure 9:
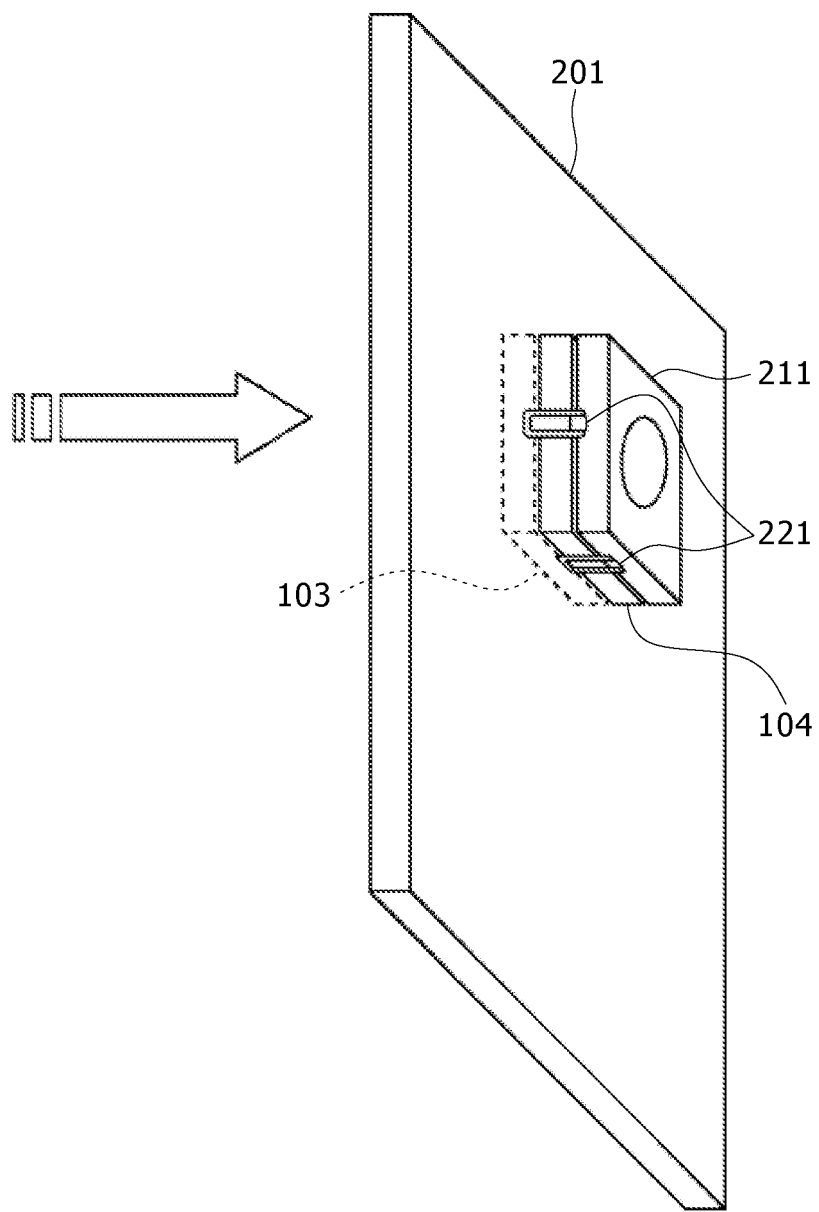
FIG. 9 depicts a schematic view showing one configuration of the wireless speaker to which the power transmission system is applied which is consistent with the present invention.

FIG. 9 shows another example of a configuration of a wireless speaker to which the power transmission system 81 according to an embodiment of the present invention is applied.

Referring to FIG. 9, also in the example shown, power is supplied to a wireless speaker 211 securely mounted on a wall face of a wall 201 by the power transmission system 81. However, in the example shown in FIG. 9, the unit 103 is built in the wall 201 which has a thickness of approximately 10 cm constructed by a two-by-four construction method. Accordingly, the unit 104 and the wireless speaker 211 are laminated in order from the location nearest to the wall face of the wall 201 of the room, that is, in the rightward direction in FIG. 9 and removably secured to each other by fixing members 221 such as hooks mounted for pivotal motion for being locked by grooves or projections.

Here, if the preferred diameter of 0.44 mm of a coil calculated using the ideal ratio can be assured by the unit 103 built in the wall 201, then the diameter of the power reception coil 171 on the unit 104 side can be reduced. Accordingly, the size of the unit 104 to be suspended on the wall face of the wall 201 can be reduced in comparison with that of the example of FIG. 8. In other words, the power transmission system 81 can be adopted as a power supply for the wireless speaker 211 of a small size without degrading the external appearance.

Further, that the size of the set of the unit 104 and the wireless speaker 211 is small signifies that it is easy to carry the same. Accordingly, if a plurality of rooms individually have a wall in which the unit 103 is built, then the user can remove the set of the unit 104 and the wireless speaker 211 having the small size and dispose the same on a wall of another room. In other words, it is easy to use the wireless speaker 211 in a plurality of rooms.

It is to be noted that the target of transmission of power by the power transmission system 81 is not limited to the wireless speaker 211 but may be, for example, a wireless television receiver. Meanwhile, the fixing members 221 are not limited to the hooks but may be a hook and loop fastener or the like.

Figure 10:
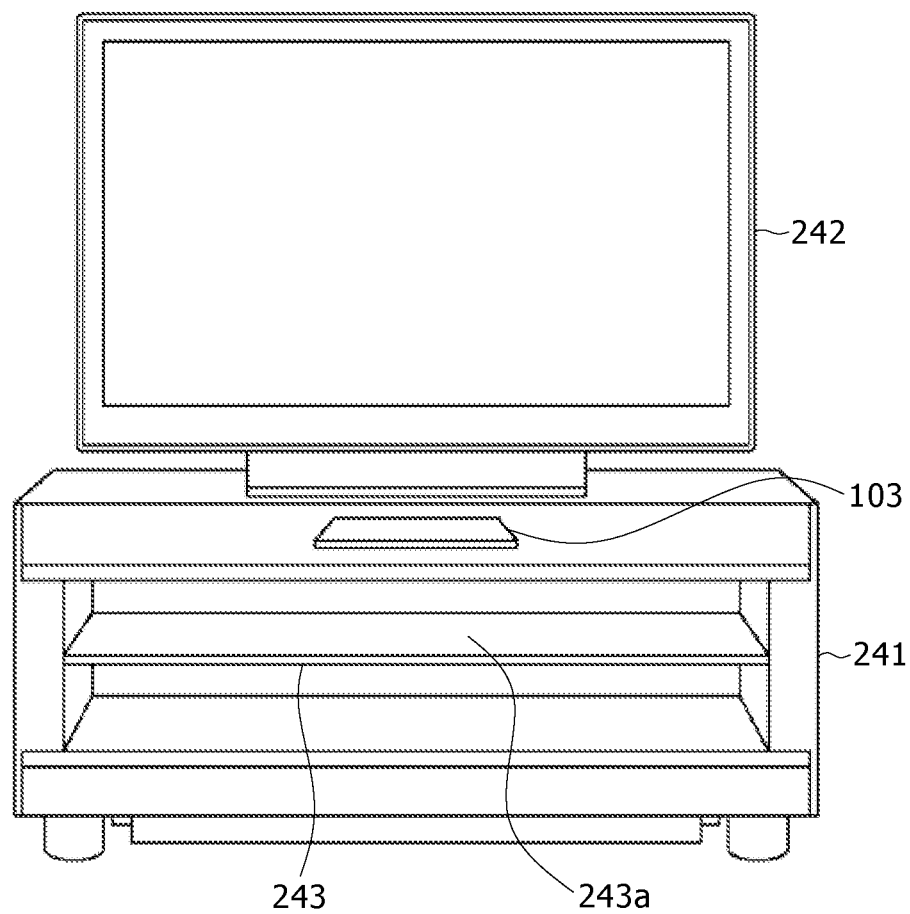
FIG. 10 depicts a schematic view showing one configuration of a television image reception apparatus to which the power transmission system is applied which is consistent with the present invention.

FIG. 10 shows an example of a configuration of a television receiver to which the power transmission system 81 according to an embodiment of the present invention is applied.

Referring to FIG. 10, in the example shown, the unit 103 is built in a rack 241 while the unit 104 not shown in FIG. 10 is built in a television receiver 242. Further, though not shown, the unit 101 and the unit 102 are laminated in order in a downward direction of the unit 103 and disposed, for example, on a face 243a of an accommodating shelf 243 of the rack 241.

Since the unit 103 and the unit 104 can be physically separated from each other in this manner, only it is necessary to build the unit 104 in the television receiver 242 but it is not necessary to build the unit 103 in the television receiver 242. If the diameter of 0.44 m is assured for the coil of the power reception side resonance circuit 151 in the unit 103 built in the rack 241, then the size of the unit 104 built in the television receiver 242 can be reduced. Accordingly, the unit 104 can be built readily in the television receiver 242 of a small size. In other words, the power transmission system 81 of the present invention can be applied also to the television receiver 242 of a small size.

It is to be noted that, in the power transmission system 81 of the present invention, from a point of view of the efficiency in power transmission, a normal to a loop plane formed from the power transmission coil of the power transmission side resonance circuit 131 included in the unit 102 and a normal to a loop plane formed from the power reception coil of the power reception side resonance circuit 151 included in the unit 103 should coincide with each other. Accordingly, where the direction of the normal to the loop plane of the power reception coil of the unit 103 is the vertical direction, it is preferable to dispose the unit 102 such that also the direction of the normal to the loop plane of the power transmission coil of the unit 102 may be the vertical direction. In other words, it is preferable to select a face of the housing of the unit 102 which opposes to the loop plane of the power transmission coil as an installation face and dispose the unit 102 such that the installation face of the housing of the unit 102 is opposed to the face 243a of the accommodating shelf 243 of the rack 241. In other words, it is not preferable from the point of view of the efficiency in power transmission to dispose the unit 102 in such a manner as to rest on the rear of the television receiver 242 or the rack 241 such that the installation face of the unit 102 and the face 243a of the accommodating shelf 243 of the rack 241 extend substantially perpendicularly to each other.

Figure 11:
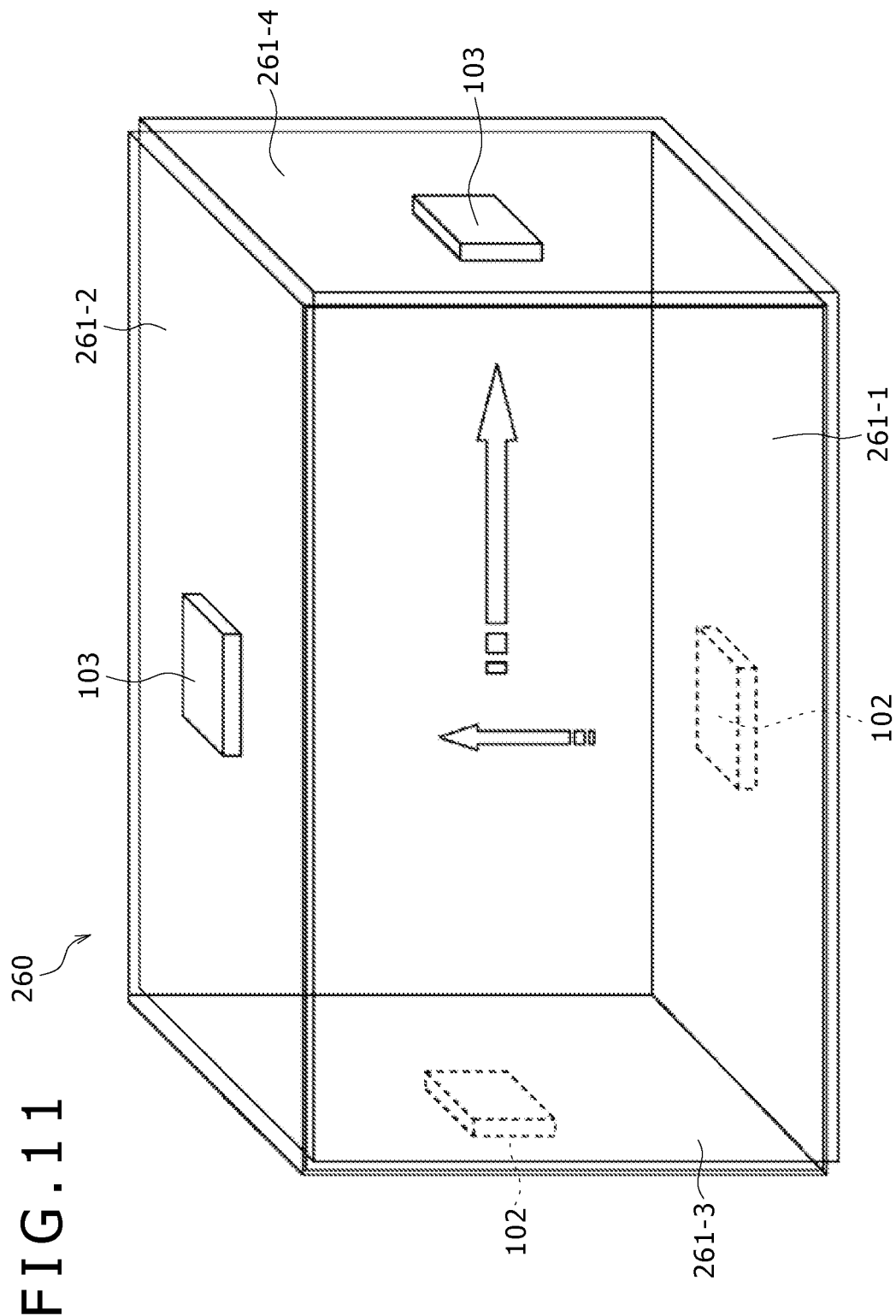
FIG. 11 depicts a schematic view showing one configuration of a room to which the power transmission system is applied which is consistent with the present invention.

FIG. 11 shows an example of a configuration of a room to which the power transmission system 81 of the present invention is applied.

If the room has a size of six mats, then the distance between walls of the room is approximately 2 m. Accordingly, even if the unit 102 and the unit 103 are built in two arbitrary walls as shown in FIG. 11, the distance L between the unit 102 and the unit 103 can be set to a preferable distance of approximately 2.2 m between the power transmission side and the power reception side calculated using then ideal ratio. In other words, power transmission between six walls having a size of six mats or the like on which the unit 102 and the unit 103 are disposed as shown in FIG. 11 can be achieved by the power transmission system 81.

In particular, for example, it is possible to build the unit 102 in the floor face 261-1 of the room 260 and build the unit 103 in the ceiling face 261-2 opposing to the floor face 261-1.

In this instance, though not shown, the unit 101 is disposed below the unit 102 in a spaced relationship by a distance of approximately several cm from the unit 102.

Further, though not shown, the unit 104 is disposed above the unit 103 in a spaced relationship by a distance of several cm from the unit 103. At this time, if the diameter of the coil of the power reception side resonance circuit 151 in the unit 103 is set to 0.44 m, then the power reception coil 171 in the unit 104 can be formed in a small size. In such an instance, it is possible, for example, to build the unit 104 of a small size in a male fitting which can be carried and form the unit 103 so as to include a plug receiver or female fitting therein. With the configuration, the user can dispose the unit 103 and the unit 104 simply by only inserting the male fitting into the female fitting.

It is to be noted that the unit 102 can be built not only in the floor face 261-1 of the room 260 but also in any arbitrary face of the room 260, for example, into the side face 261-3.

Meanwhile, although the power from the unit 102 is transmitted most effectively to a perpendicular direction to the plane in which the unit 102 is built, that is, in a direction toward the opposing face, it is not transmitted only to the direction but is transmitted also to the other faces of the room 260. For example, where the unit 102 is built in the floor face 261-1, power is transmitted not only to the opposing ceiling face 261-2 but also to the other wall faces such as the perpendicular floor face 261-4. Accordingly, even where the unit 102 is built in the floor face 261-1, there is no necessity to particularly build the unit 103 in the ceiling face 261-2 but the unit 103 can be built in the other wall faces such as the wall face 261-4. In short, the unit 103 can be built in an arbitrary wall face of the room 260 without depending upon the arrangement position of the unit 102.

The power transmission system 81 of the present invention can be applied to various fields because the units 101 to 104 of the components thereof can be physically separated from each other as described above. Particularly, there is no necessity to provide a housing for exclusive use for the unit 104. Accordingly, for example, it is possible to accommodate the bridge rectification circuit 172 and the smoothing capacitor 173 from among the components of the unit 104 in a housing of a small-sized apparatus and dispose the power reception coil 171 outside the small-sized apparatus. In this manner, the power transmission system 81 of the present invention can be applied readily as a power supply for a small-sized apparatus.

In the following, particular examples of a small-sized apparatus to which the power transmission system 81 of the present invention is applied are described with reference to FIGS. 12A to 14. In particular, in the examples described below, the power transmission system 81 of the present invention is adopted as a charging power supply for a small-sized apparatus by disposing the power reception coil 171 of one turn in a part of the small-sized apparatus or in an accessory of the small-sized apparatus.

Figure 12A:
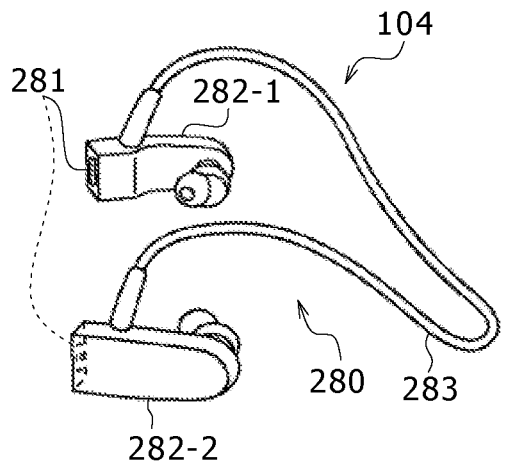
FIGS. 12A to 12C depicts views showing one configuration of a portable type audio player to which the power transmission system is applied which is consistent with the present invention.
Figure 12B:
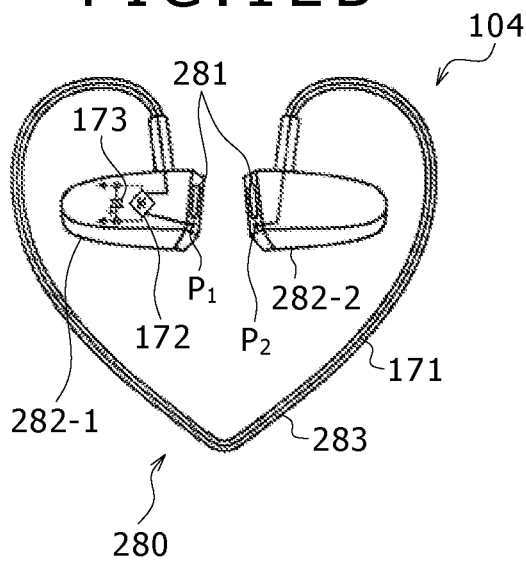
Figure 12C:
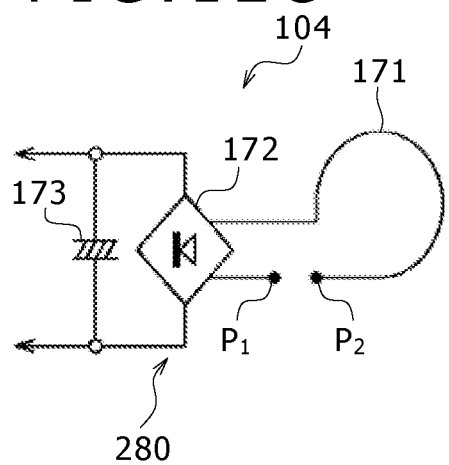

Referring first to FIGS. 12A to 12C, there is shown an example of a configuration of a portable audio player to which the power transmission system 81 of the present invention is applied.

In the example shown in FIGS. 12A to 12C, the units 101 to 103 not shown from among the units 101 to 104 which compose the power transmission system 81 are accommodated in respective housings for exclusive use, and the unit 104 is incorporated in a portable audio player.

FIG. 12A shows a basic configuration of a portable audio player 280 represented by the Walkman (registered trademark of Sony Corporation). An earphone 282-1 and another earphone 282-2 are connected to each other by a head band 283. When the left and right earphones 282-1 and 282-2 are disposed in the proximity of each other, they are coupled to and integrated with each other by magnetic force of magnets 281 installed in the earphones 282-1 and 282-2.

FIG. 12B shows arrangement of coils of the portable audio player 280 shown in FIG. 12A. Referring to FIG. 12B, a bridge rectification circuit 172 and a smoothing capacitor 173 are built in the earphone 282-1, and also parts to which power is supplied such as a charging circuit not shown are built in the earphone 282-1. A conductor which forms the power reception coil 171 is built in the head band 283, and if the left and right earphones 282-1 and 282-2 are brought into contact with each other by the magnets 281, then the conductor built in the head band 283 is connected at contacts $P_1$ and $P_2$ thereof to configure the power reception coil 171 of one loop.

FIG. 12C shows an electric configuration of the unit 104 built in the portable audio player 280 shown in FIG. 12B. When the contact $P_1$ and the contact $P_2$ are connected to each other, the power reception coil 171 of one loop is configured as described above, and as a result, the power reception coil 171, bridge rectification circuit 172 and smoothing capacitor 173 are electrically connected to each other. Accordingly, power transmitted from the unit 103 is provided to those parts of the portable audio player 280 such as the charging circuit which require power through the unit 104.

It is to be noted that, although it is possible to fold back the conductor in the head band 283 to configure a coil, the directions flowing in the two folded back conductor portions are opposite to each other. As a result, no current flows after all and no power is obtained. In other words, the power reception coil 171 does not operate. Accordingly, it is preferable to use the contact $P_1$ and the contact $P_2$ to connect the conductor in the head band 283 to configure the power reception coil 171 as shown in FIGS. 12A to 12C.

If the portable audio player 280 having such a configuration as described above is placed on an upper face of the unit 103 in a state wherein the left and right earphones 282-1 and 282-2 are coupled to each other by the magnets 281, then power from the unit 103 is supplied to the portable audio player 280. In other words, where the portable audio player 280 requires charging or power, only it is necessary for the user to couple the left and right earphones 282-1 and 282-2 to each other by means of the magnets 281 and place the portable audio player 280 on the upper face of the unit 103.

Figure 13:
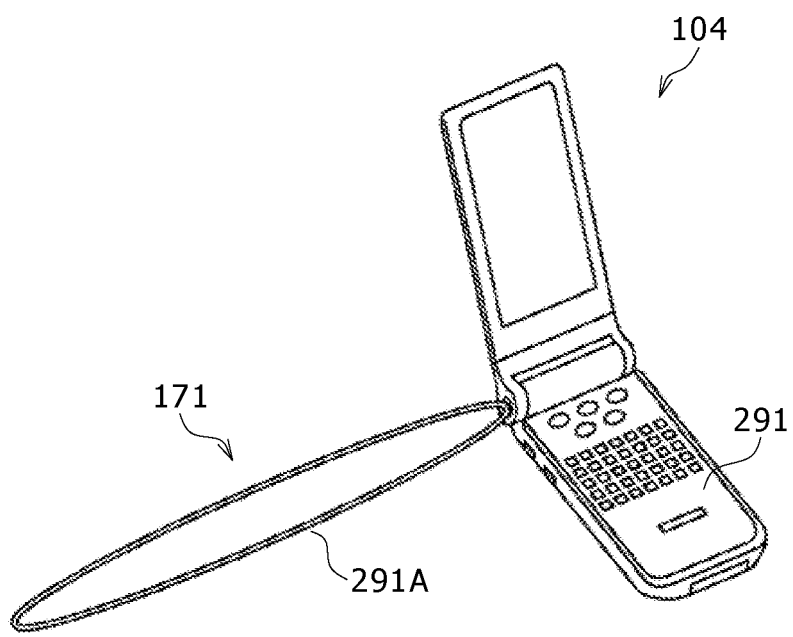
FIG. 13 depicts a schematic view showing one configuration of a portable telephone set to which the power transmission system is applied which is consistent with the present invention.

FIG. 13 shows an example of a configuration of a portable telephone set to which the power transmission system 81 of the present invention is applied.

Referring to FIG. 13, in the example shown, the units 101 to 103 not shown from among the units 101 to 104 which configure the power transmission system 81 are accommodated in respective housings for exclusive use. The unit 104 is incorporated in the portable telephone set 291. The bridge rectification circuit 172 and the smoothing capacitor 173 of the unit 104 are accommodated in a housing of the portable telephone set 291 while the power reception coil 171 of one turn of the unit 104 is accommodated in a strap 291A of the portable telephone set 291.

If such a portable telephone set 291 as described above is placed on the upper face of the unit 103, then power from the unit 103 is supplied to the portable telephone set 291. In other words, it is only necessary for the user to place, when the portable telephone set 291 requires charging or power, the portable telephone set 291 on the upper face of the unit 103.

Figure 14:
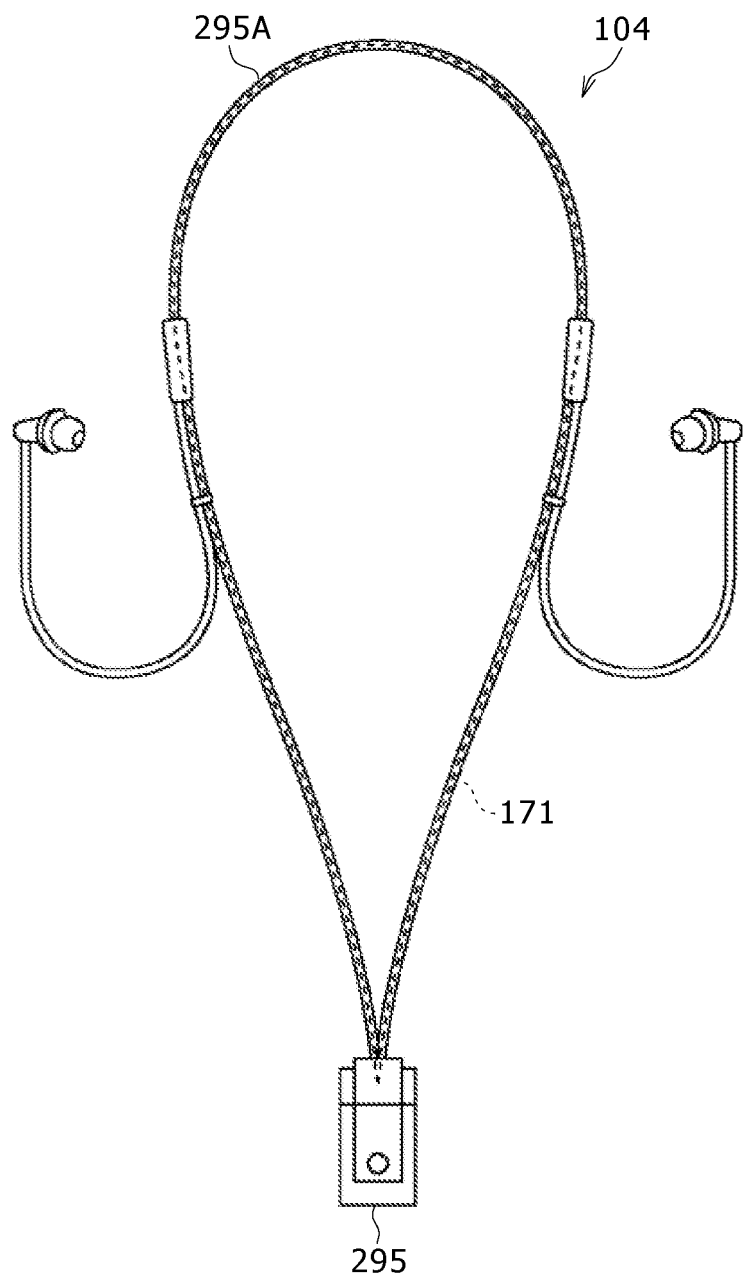
FIG. 14 depicts a schematic view showing one configuration of a portable type audio player to which the power transmission system is applied which is consistent with the present invention.

FIG. 14 shows an example of a configuration of a portable audio player to which the power transmission system 81 of the present invention is applied.

Referring to FIG. 14, in the example shown, the units 101 to 103 not shown from among the units 101 to 104 which configure the power transmission system 81 are accommodated in respective housings for exclusive use. The unit 104 is incorporated in the portable audio player 295. The bridge rectification circuit 172 and the smoothing capacitor 173 of the unit 104 are accommodated in a housing of the portable audio player 295 while the power reception coil 171 of one turn of the unit 104 is accommodated in a strap 295A of the portable audio player 295.

If such a portable audio player 295 as described above is placed on the upper face of the unit 104, then power from the unit 103 is supplied to the portable audio player 295. In other words, when the portable audio player 295 requires charting or power, it is necessary for the user only to place the portable audio player 295 on the upper face of the unit 103.

It is to be noted that the small-sized apparatus to which the power transmission system 81 of the present invention can be applied is any small-sized apparatus which requires power and is not particularly limited to the small-sized apparatus of the examples described above. For example, though not shown, it is possible to incorporate the unit 104 in a wristwatch of the electronic type and dispose the power reception coil 171 on the band of the wristwatch such that the power transmission system of the present invention is adopted as a power supply for the wristwatch.

In the foregoing, several particular examples of the power transmission system 81 of the present invention are described paying attention to the unit 104. Now, particular examples of the power transmission system 81 of the present invention are described paying attention to the unit 103.

As described hereinabove, even if the arrangement relationship of the power reception side resonance circuit 151 of the unit 103 and the power reception coil 171 of the unit 104 varies by approximately several cm, the power transmission system 81 of the present invention can transmit power. However, the transmission efficiency varies in response to the relative arrangement relationship of the power reception side resonance circuit 151 and the power reception coil 171. Accordingly, the housing of the unit 103 preferably has a shape with which the arrangement relationship of the power reception side resonance circuit 151 and the power reception coil 171 is minimized when the unit 104 is placed on the housing of the unit 103.

Figure 15A:
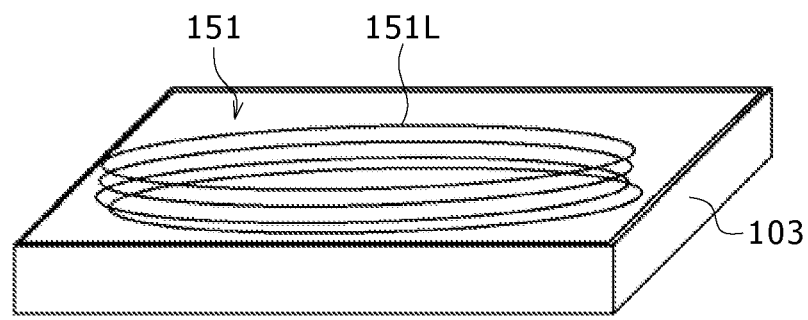
FIGS. 15A and 15B depicts schematic views showing one configuration of a housing of the unit consistent with the present invention.
Figure 15B:
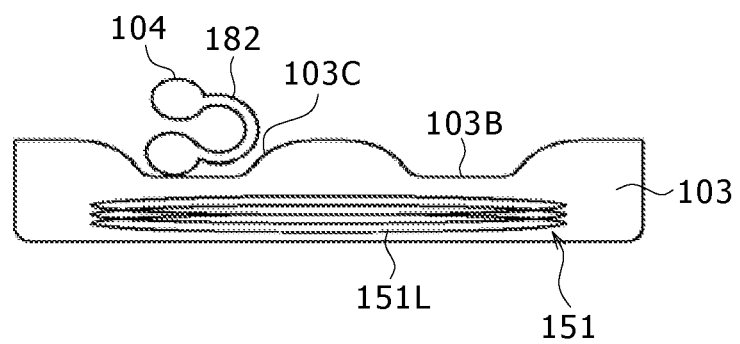

FIGS. 15A and 15B show an example of a configuration of the housing of the unit 103. In particular, FIG. 15A shows a perspective view of the housing and FIG. 15B shows a side elevational sectional view of the housing.

Referring to FIGS. 15A and 15B, the upper face of the housing of the unit 103, that is, the face of the housing on which the unit 104 is to be placed, has unevenness formed thereon by providing a gradient around the coil 151L of the reception side resonance circuit 151 built in the unit 103.

In particular, a recess 103B is formed at a portion of the upper face of the housing around the coil 151L which configures the built-in power reception side resonance circuit 151. Accordingly, when the user places the headphone 182 in which the unit 104 is built on the upper face of the unit 103, even if the headphone 182 is placed at a central portion of the upper face, the headphone 182 drops along the gradient 103C formed on the upper face of the unit 103 until it is disposed in the recess 103B. In particular, when the headphone 182 is disposed in the recess 103B, the power reception side resonance circuit 151 and the power reception coil 171 are positioned in the proximity of each other, and an optimum relative arrangement relationship is established between them. As a result, the transmission efficiency of the power transmission system 81 is improved.

It is to be noted that, while, in the example of FIGS. 15A and 15B, the recess 103B is formed on the inner side of the loop of the coil 151L which configures the power reception side resonance circuit 151 from within the upper face of the unit 103, the formation of the recess 103B is not limited to this. For example, the recess 103B may be formed on the outer side of the loop of the coil 151L which configures the power reception side resonance circuit 151.

The power transmission system 81 of the first embodiment of the present invention has been described as above.

Incidentally, the power transmission system 81 of the present invention applies a magnetic field resonance type power transmission technique. In the power transmission system 81 according to the first embodiment described above, the resonance frequencies f131 and f151 are ideally 13.56 MHz of the ISM band. In this instance, the attenuation amount is 0 and the transmission efficiency is highest where the resonance frequency f121 of the oscillation circuit 121 of the power transmission apparatus 91 is 13.56 MHz equal to the resonance frequencies f131 and f151 as seen from FIG. 2. In another embodiment, the resonance frequencies f131 and f151 are 120 kHz of the ISM band.

However, even if the resonance frequency f121 is displaced only by such a small amount as approximately 0.5 MHz from 13.56 MHz of the resonance frequencies f131 and f151 as seen in FIG. 2, the transmission efficiency drops by a great amount of approximately 20 dB. This signifies that, where the resonance frequency f121 is fixed to 13.56 MHz, if a metal article or a man approaches the resonance circuit to vary the stray capacitance, resulting in variation of the resonance frequencies f131 and f151, then the transmission efficiency drops significantly. The resonance frequencies f131 and f151 of the power transmission side resonance circuit 131 and the power reception side resonance circuit 151 having high Q values are generally likely to be influenced by a neighboring metal article or man, the temperature, the humidity and so forth.

Further, the power transmission side resonance circuit 131 and the power reception side resonance circuit 151 are designed such that the resonance frequencies f131 and f151 thereof ideally coincide with the resonance frequency f121 as described hereinabove. However, it is difficult to produce, by mass production, the power transmission side resonance circuit 131 and the power reception side resonance circuit 151 whose resonance frequencies f131 and f151 coincide with a high degree of accuracy with the resonance frequency f121.

From the foregoing, the resonance frequencies f131 and f151 during use of the power transmission side resonance circuit 131 and the power reception side resonance circuit 151 are sometimes different from the resonance frequency f121. In such an instance, the transmission efficiency deteriorates.

Therefore, in the power transmission system 81 according to the second embodiment of the present invention, a technique of varying the resonance frequencies so as to coincide with the oscillation frequency in response to an environment therearound is applied. It is to be noted that such a technique as just described is hereinafter referred to as resonance frequency variation technique.

FIG. 16 shows a configuration of the power transmission system of the second embodiment of the present invention.

Referring to FIG. 16, the power transmission system 301 includes several common components to those of the power transmission system described hereinabove with reference to FIG. 3. Overlapping description of such common components is omitted herein to avoid redundancy.

The power transmission system 301 shown includes a power transmission apparatus 491 and a power reception apparatus 492. The power transmission apparatus 491 and the power reception apparatus 492 are disposed physically separately from each other in a spaced distance from each other by a distance L.

The power transmission apparatus 491 is configured from a unit 501 having a single housing and another unit 502 having a single housing. The unit 501 and the unit 502 can be physically separated from each other, and where power is to be transmitted to the power reception apparatus 492, the unit 501 and the unit 502 are disposed in contact with each other or in a spaced relationship from each other by a distance of, for example, approximately several cm.

The unit 501 has a configuration similar to that of the unit 101 described hereinabove with reference to FIG. 3. In particular, the unit 501 is configured from an oscillation circuit 121 and a power transmission coil 122 connected to the oscillation circuit 121.

A power transmission side resonance circuit 621 is provided in the unit 502. The power transmission side resonance circuit 621 includes the power transmission side resonance circuit 131 described hereinabove with reference to FIG. 3 and a series circuit of a varicap element 641 and a capacitor 642 connected in parallel to the power transmission side resonance circuit 131.

If the capacitance value of the varicap element 641 is represented by Cvs and the capacitance value of the capacitor 642 is represented by Ccs, then the resonance frequency f621 of the power transmission side resonance circuit 621 is represented by the following expression (4):

$$f_{621} = \frac{1}{2\pi\sqrt{Ls\left(Cs + \frac{CvsCcs}{Cvs + Ccs}\right)}} \quad (4)$$

In the expression (4), the capacitance value Ccs of the capacitor 642 is a predetermined value while the capacitance value Cvs of the varicap element 641 is a variable value. The varicap element 641 is a device also called varactor diode or variable capacitance diode and has a characteristic that, as the application voltage increases, the capacitance value Cvs thereof decreases.

In particular, the application voltage to the varicap element 641 is varied to vary the capacitance value Cvs of the varicap element 641, and as a result, the resonance frequency f621 of the power transmission side resonance circuit 621 can be varied thereby. Accordingly, it is possible to suppress a drop of the transmission efficiency, that is, to transmit power stably in a contactless condition, by varying the resonance frequency f621 of the power transmission side resonance circuit 621 so as to coincide with the resonance frequency f121.

In order to vary the resonance frequency f621 of the power transmission side resonance circuit 621 so as to coincide with the resonance frequency f121, it is preferable to carry out appropriate control of the capacitance value Cvs of the varicap element 641, that is, to carry out appropriate control of the application voltage to the varicap element 641. Therefore, in order to implement such control (hereinafter referred to as transmission side resonance frequency variation control), the power transmission apparatus 491 further includes an antenna 622, a reception circuit 623 and a D/A conversion circuit 624.

The reception circuit 623 as control means receives control data transmitted thereto by wireless from the power reception apparatus 492 through the antenna 622. Although details are hereinafter described, the control data includes a changing instruction of the application voltage to the varicap element 641 and so forth.

Thus, the reception circuit 623 generates an instruction in the form of digital data of an application voltage to the varicap element 641 and supplies the instruction to the D/A conversion circuit 624. The D/A conversion circuit 624 varies the application voltage to the varicap element 641 in accordance with the instruction from the reception circuit 623. In particular, the D/A conversion circuit 624 applies an analog voltage corresponding to the digital data or instruction from the reception circuit 623 to the varicap element 641.

Consequently, the capacitance value Cvs of the varicap element 641 varies, and as a result, the resonance frequency f621 of the power transmission side resonance circuit 621 varies.

In this manner, the transmission side resonance frequency variation control is executed based on the control data transmitted from the power reception apparatus 492. It is to be noted that details of the transmission side resonance frequency variation control are hereinafter described with reference to FIG. 17.

The circuits for implementing such transmission side resonance frequency variation control as just described, that is, the reception circuit 623 and the D/A conversion circuit 624, are an example of parts which require power. Accordingly, in order to supply power to the reception circuit 623 and the D/A conversion circuit 624, a unit power supply circuit 132 having a configuration similar to that of the unit 102 described hereinabove with reference to FIG. 3 is provided in the unit 502.

The power reception apparatus 492 is configured from a unit 503 having a single housing and another unit 504 having a single housing. The unit 503 and the unit 504 can be physically separated from each other, and when power from the power transmission apparatus 491 is to be received, the unit 503 and the unit 504 are disposed in a contacting relationship with each other or in a spaced relationship from each other by a distance of, for example, approximately several cm.

The unit 503 includes a power reception side resonance circuit 661 and further includes a unit power supply circuit 152 having a configuration similar to that of the unit 103 described hereinabove with reference to FIG. 3. The power reception side resonance circuit 661 includes the power reception side resonance circuit 151 described hereinabove with reference to FIG. 3 and a series circuit of a varicap 681 and a capacitor 682 connected in parallel.

If the capacitance value of the varicap 681 is represented by Cvr and the capacitance value of the capacitor 682 is represented by Ccr, then the resonance frequency f661 of the power reception side resonance circuit 661 is represented by the following expression (5):

$$f_{661} = \frac{1}{2\pi\sqrt{Lr\left(Cr + \frac{CvrCcr}{Cvr + Ccr}\right)}} \quad (5)$$

In the expression (5), the capacitance value Ccr of the capacitor 682 is a predetermined value while the capacitance value Cvr of the varicap 681 is a variable value from a similar reason to that described hereinabove with regard to the expression (4) given hereinabove.

The capacitance value Cvr of the varicap 681 varies by varying the application voltage to the varicap 681, and as a result, the resonance frequency f661 of the power reception side resonance circuit 661 can be varied thereby. Consequently, it is possible to suppress deterioration of the transmission efficiency, that is, to transmit the power stably in a contactless condition, by varying the resonance frequency f661 of the power reception side resonance circuit 661 so as to coincide with the resonance frequency f121.

In other words, in order to vary the resonance frequency f661 of the power reception side resonance circuit 661 so as to coincide with the resonance frequency f121, it is preferable to carry out appropriate control of the capacitance value Cvr of the varicap 681, that is, to carry out appropriate control of the application voltage to the varicap 681. Therefore, in order to implement such control (hereinafter referred to as reception side resonance frequency variation control), the power reception apparatus 492 further includes an A/D conversion circuit 662, a microcomputer 663 and a D/A conversion circuit 664.

The A/D conversion circuit 662 converts an analog voltage across the smoothing capacitor 163 into an output voltage value V in the form of digital data and supplies the output voltage value V to the microcomputer 663.

The microcomputer 663 controls operation of the entire unit 503.

For example, the microcomputer 663 generates an instruction or digital data of an application voltage to the varicap 681 on the reception side based on the output voltage value V of the A/D conversion circuit 662 and supplies the instruction to the D/A conversion circuit 664.

The D/A conversion circuit 664 varies the application voltage to the varicap 681 in accordance with the instruction from the microcomputer 663. The D/A conversion circuit 664 applies an analog voltage corresponding to the digital data or instruction from the microcomputer 663 to the varicap 681.

Consequently, the capacitance value Cvr of the varicap 681 is changed, and as a result, the resonance frequency f661 of the power reception side resonance circuit 661 varies.

In this manner, the reception side resonance frequency variation control is executed based on the output voltage value V of the A/D conversion circuit 662. It is to be noted that the reception side resonance frequency variation control is hereinafter described in detail with reference to FIG. 17.

Further, for example, the microcomputer 663 generates control data including a changing instruction of the application voltage to the varicap element 641 on the transmission side based on the output voltage value of the A/D conversion circuit 662.

The control data is used for the transmission side resonance frequency variation control as described hereinabove. The control data need be transferred to the power transmission apparatus 491. To this end, the power reception apparatus 492 further includes a transmission circuit 665 and an antenna 666.

In particular, the control data generated by the microcomputer 663 is supplied to the transmission circuit 665 serving as control means. The transmission circuit 665 transmits the control data from the microcomputer 663 by wireless to the power transmission apparatus 491 through the antenna 666. Consequently, as described hereinabove, the power transmission apparatus 491 uses the control data to vary the application voltage to the varicap element 641 on the transmission side. Thus, the capacitance value Cs is changed, and as a result, the resonance frequency f621 of the power transmission side resonance circuit 621 varies. The transmission side resonance frequency variation control is executed in this manner. It is to be noted that further details of the transmission side resonance frequency variation control are hereinafter described with reference to FIG. 17.

The circuitry for implementing such transmission side resonance frequency variation control and reception side resonance frequency variation control as described above, that is, the A/D conversion circuit 662, microcomputer 663, D/A conversion circuit 664 and transmission circuit 665, are an example of parts which require power. Accordingly, the unit power supply circuit 152 supplies power to the parts mentioned.

The unit 504 has a configuration similar to that of the unit 104 described hereinabove with reference to FIG. 3. In particular, the unit 504 includes a power reception coil 171, a bridge rectification circuit 172 and a smoothing capacitor 173.

[Example of Operation of the Power Transmission System of the Second Embodiment]

Now, an example of operation of the power transmission system 301 having the configuration described above with reference to FIG. 16 is described.

It is to be noted, however, that, from within operation of the power transmission system 301, operation itself of power transmission from the power transmission apparatus 491 to the power reception apparatus 492 is basically similar to that of the power transmission system 81 described hereinabove with reference to FIG. 3. Therefore, overlapping description the power transmission operation is omitted herein to avoid redundancy.

Therefore, of the operation of the power transmission system 301, a process of implementing the reception side resonance frequency variation control and the transmission side resonance frequency variation control is described below. It is to be noted that the process is hereinafter referred to as resonance frequency controlling process.

The power supplied from the power transmission apparatus 491 to the power reception apparatus 492 is hereinafter referred to as reception power. Where the reception power is represented by P, the reception power P is represented by the following expression (6):

$$P = \frac{V^2}{R} \quad (6)$$

where R is the resistance value of a load to the power reception apparatus 492.

Here, the transmission side resonance frequency variation control and the reception side resonance frequency variation control are controls for varying the resonance frequencies f621 and f661 so as to coincide with the resonance frequency f121. Since the transmission efficiency is highest when the resonance frequencies f621 and f661 coincide with the resonance frequency f121 as described hereinabove with reference to FIG. 2, the reception power P is in the maximum. In particular, control for varying the resonance frequencies f621 and f661 so that the reception power P may be maximized should be adopted as the transmission side resonance frequency variation control and the reception side resonance frequency variation control. More particularly, if the load is a fixed load, then the resistance value R of the load is fixed, and the reception power P increases in proportion to the square of the output voltage value V as given by the expression (6) given hereinabove. Accordingly, the control for varying the resonance frequencies f621 and f661 so as to maximize the output voltage value V should be adopted as the reception side resonance frequency variation control. An example of a resonance frequency controlling process for implementing such reception side resonance frequency variation control and transmission side resonance frequency variation control is illustrated in FIG. 17.

Figure 17:
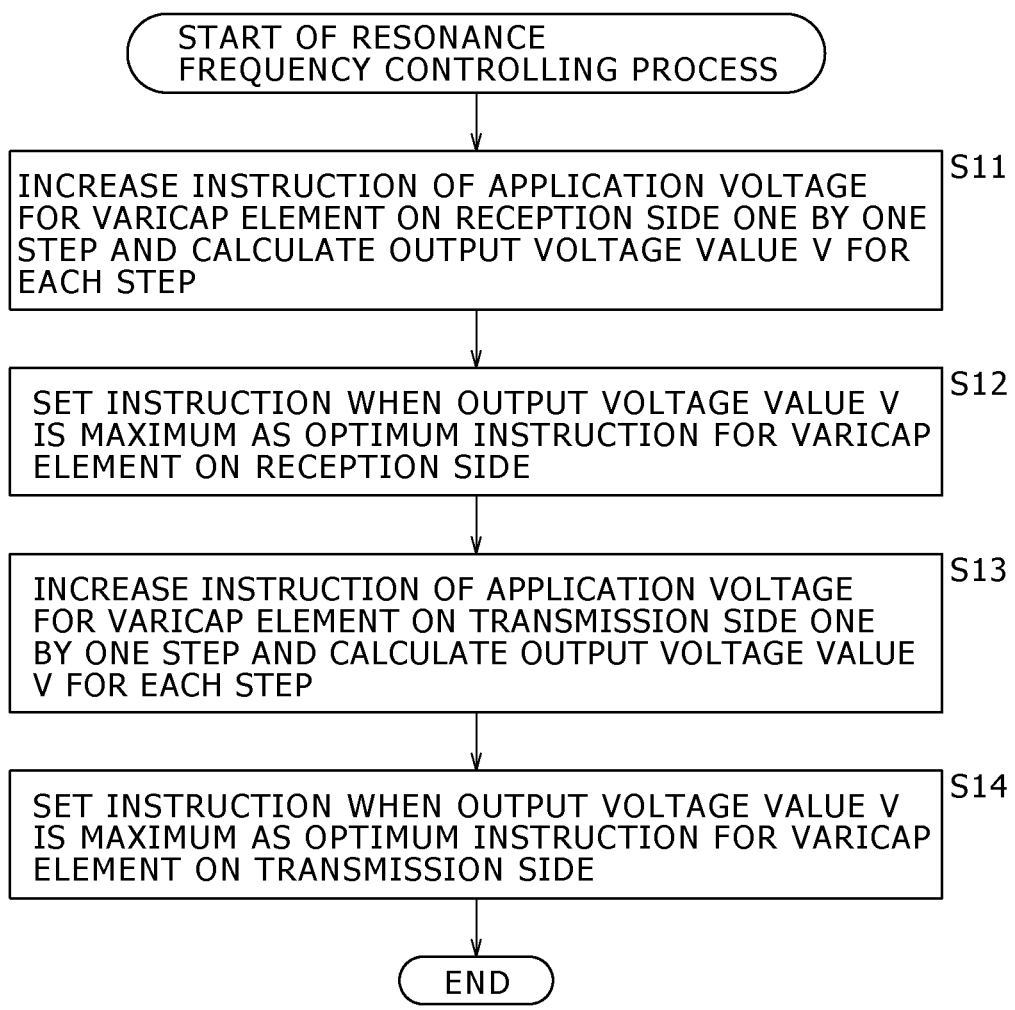
FIG. 17 depicts a flow chart illustrating one configuration of a resonance frequency controlling process of the power transmission system which is consistent with the present invention.

Referring to FIG. 17, first at step S11, the microcomputer 663 increments the instruction of the application voltage to the varicap 681 on the reception side one by one step and measures the output voltage value V for each voltage step.

At step S12, the microcomputer 663 sets an instruction when the output voltage value V becomes highest as an optimum instruction for the varicap 681 on the reception side.

Thereafter, the microcomputer 663 continues to output the optimum instruction in the form of digital data to the D/A conversion circuit 664. Consequently, the resonance frequency f661 of the power reception side resonance circuit 661 soon becomes equal to the frequency with which the output voltage value V becomes highest, that is, to a frequency substantially coincident with the resonance frequency f121.

More particularly, for example, if the application voltage to the varicap 681 rises, then the capacitance value Cvr of the varicap 681 decreases as described hereinabove, and the resonance frequency f661 of the power reception side resonance circuit 661 increases as indicated by the expression (5) given hereinabove. On the contrary, if the application voltage to the varicap 681 drops, then the capacitance value Cvr of the varicap 681 increases as described hereinabove, and the resonance frequency f661 of the power reception side resonance circuit 661 decreases as indicated by the expression (5) given hereinabove.

Accordingly, in order to make the resonance frequency f661 of the power reception side resonance circuit 661 substantially coincide with the resonance frequency f121, it is necessary to make it possible to adjust the resonance frequency f661 in both of the increasing direction and the decreasing direction. In other words, it is necessary to make it possible to adjust the capacitance value Cvr of the varicap 681 not only in the increasing direction but also in the decreasing direction such that the capacitance value Cvr of the varicap 681 with which the reception power P is maximized falls in the variation range even when a metal article or a man approaches. Further, since the varicap 681 has some dispersion in characteristic, it is necessary to make such adjustment possible taking the dispersion into consideration.

In order to make such adjustment possible, preferably the resonance frequency f681 in an ideal state in which any of a metal article and a man is not positioned in the neighborhood is equal to an object frequency, that is, an object resonance frequency f121 when the capacitance value Cvr of the varicap 681 is equal to a middle capacitance value within the variation range. Therefore, for example, in the present embodiment, the inductance Lr of the coil of the power reception side resonance circuit 661 and the capacitance value Ccr of the capacitor 682 are adjusted so as to establish the state just described.

Accordingly, for example, in the present embodiment, when the instruction of an application voltage to the varicap 681 on the reception side is increased one by one step by the processing at step S11, the output voltage value V should naturally become the maximum value at a particular voltage step before the instruction of the highest voltage step is reached. For example, in an ideal state wherein any of a metal item and a man is not positioned in the neighborhood, the output voltage value V should naturally become the maximum value at a substantially middle voltage step within the variation range of the instruction of an application voltage to the varicap 681. On the other hand, for example, in a state wherein a metal article or a man is positioned in the neighborhood, the output voltage value V should naturally become the maximum value at a voltage step displaced a little forwardly or backwardly of the middle step.

Figure 18:
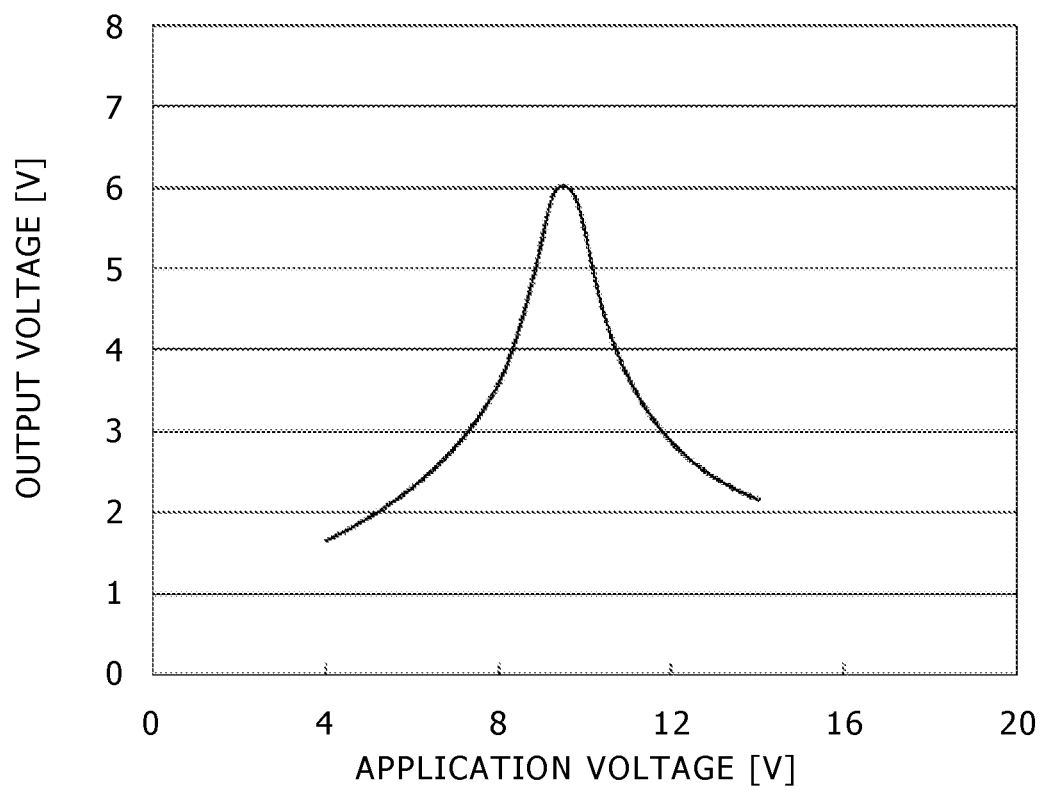
FIG. 18 depicts a diagram illustrating a relationship between an application voltage of a varicap element on the power reception side and an output voltage value which is consistent with the present invention.

For example, FIG. 18 illustrates a relationship between the application voltage to the varicap 681 on the reception side and the output voltage value V.

Referring to FIG. 18, the axis of ordinate indicates the output voltage value V, and the axis of abscissa indicates the application voltage to the varicap 681 on the reception side.

From the example of FIG. 18, it can be seen that the output voltage value V exhibits a mountain-shaped variation such that, when the application voltage to the varicap 681 on the reception side is approximately 10 V, the top of the mountain is exhibited, that is, the output voltage value V exhibits the maximum value.

Therefore, in the processing at step S12, the instruction or digital data when the output voltage value V exhibits a maximum value, in the example of FIG. 18, the instruction at a voltage step around approximately 10 V, is set as the optimum instruction for the varicap 681 on the reception side.

In this manner, the reception side resonance frequency variation control is implemented by the processing at steps S11 and S12.

Then, the transmission side resonance frequency variation control is implemented by processing at steps beginning with step S13.

In particular, at step S13, the microcomputer 663 increments the instruction of the application voltage to the varicap element 641 on the transmission side one by one voltage step and outputs the output voltage value V for each voltage step.

In particular, for example, the microcomputer 663 generates control data including a changing instruction for incrementing the instruction of the application voltage to the varicap element 641 on the transmission side by one voltage step and so forth and transmits the control data by wireless to the power transmission apparatus 491 through the transmission circuit 665 and the antenna 666. Then, the power transmission apparatus 491 increases the application voltage to the varicap 641 on the transmission side one by one step based on the control data as described above. Consequently, the capacitance value Cvs varies to vary the resonance frequency f621 of the power transmission side resonance circuit 621. As a result, the output voltage value V of the power reception apparatus 492 varies. Therefore, the microcomputer 663 measures the varied output voltage value V. As the processing at step S13, such a sequence of processes as just described are executed for each voltage step.

It is to be noted that, from a reason similar to that described hereinabove with regard to the varicap 681 on the reception side, preferably the resonance frequency f621 in an ideal state in which any of a metal item and a man is not positioned closely is equal to an object frequency, that is, an object resonance frequency f121 when the capacitance value Cvs of the varicap element 641 is equal to a middle capacitance value within the variation range. Therefore, for example, in the present embodiment, the inductance Ls of the coil of the power transmission side resonance circuit 621 and the capacitance value Ccs of the capacitor 642 are adjusted so as to establish the state just described.

At step S14, the microcomputer 663 sets the instruction when the output voltage value V becomes a maximum value as an optimum instruction for the varicap element 641 on the power transmission side.

In particular, for example, the microcomputer 663 generates control data including a setting command for an optimum instruction of the application voltage to the varicap element 641 on the transmission side and so forth and transmits the control data to the power transmission apparatus 491 through the transmission circuit 665 and the antenna 666.

Consequently, the power transmission apparatus 491 continues to apply an application voltage in accordance with the optimum instruction to the varicap element 641 on the transmission side. As a result, the resonance frequency f621 of the power transmission side resonance circuit 621 soon becomes equal to a frequency with which the output voltage value V is maximized, that is, which substantially coincides with the resonance frequency f121.

In the power transmission system 301 of the second embodiment, the resonance frequency controlling process is executed in this manner. Consequently, the resonance frequencies are automatically controlled so that the reception power P exhibits a maximum value. As a result, power can be supplied stably from the power transmission apparatus 491 to the power reception apparatus 492.

This does not vary even if the resonance frequency f621 or f661 disperses. In other words, in the power transmission system 301 of the second embodiment, since the resonance frequency controlling process is executed, a dispersion of the resonance frequencies f621 and f661 is permitted. As a result, where the power transmission system 301 of the second embodiment is compared with the power transmission system 81 of the first embodiment, it is facilitated to produce the power transmission system 301 of the second embodiment by mass production. In particular, since the power transmission system 81 of the first embodiment cannot execute the resonance frequency controlling process, a dispersion of the resonance frequency is not permitted. However, it is difficult to suppress a dispersion of the resonance frequency in production, and as a result, it is estimated that it may possibly be difficult to produce the power transmission system 81 of the first embodiment by mass production. This difficulty is eliminated by the power transmission system 301 of the second embodiment because a dispersion of the resonance frequencies f621 and f661 is permitted.

It is to be noted that the starting timing of the resonance frequency controlling process of FIG. 17 is not restricted particularly. For example, as the starting timing, a timing at which the power reception apparatus 492 is energized can be adopted. Or, for example, a timing at which the output voltage value V drops, another timing at which a predetermined interval of time elapses, a further timing designated by the user or some other timing can be adopted as the starting timing.

Further, in the resonance frequency controlling process, two controls including the reception side resonance frequency variation control and the transmission side resonance frequency variation control are implemented. However, it is possible to carry out only one of the two controls. For example, where one of the power transmission side resonance circuit 621 and the power reception side resonance circuit 661 is disposed at a remote place which is not approached by a metal article or a man and is not influenced by them, only the other one of them may be controlled.

Further, from a point of view that the reception side resonance frequency variation control and the transmission side resonance frequency variation control are implemented, the controlling techniques may be any technique only if it can control the resonance frequency so that the reception power P may be maximized and are not restricted particularly to the technique described hereinabove.

For example, as a technique for varying the resonance frequency, that is, as the resonance frequency variation technique described hereinabove, a method of varying the application voltage to the varicap elements 641 and 681 is adopted.

However, the resonance frequency variation technique is not restricted particularly to the example described hereinabove, but, for example, a technique of using a motor-driven variable capacitor or variable resistor other than a varicap element to vary the inductance L or the capacitance C of a resonance circuit can be adopted. Also, for example, a technique of displacing the core of a coil which configures a resonance circuit or changing the distance of a coil or electrically switching a tap of a coil to vary the inductance L can be adopted.

Also it is possible to change the oscillation frequency of the oscillation circuit 121 of the unit 501 in accordance with a signal from the transmission circuit 665. In this instance, the antenna 622 and the reception circuit 623 are provided in the unit 501.

Also the power transmission system 301 according to the embodiment of FIG. 16 can naturally be applied to the configuration shown in FIGS. 4 to 15B.

[Application of the Invention to a Program]

While the series of processes described above can be executed by hardware, it may otherwise be executed by software.

In this instance, for example, a personal computer shown in FIG. 19 may be used at least as part of the image processing apparatus described hereinabove.

Figure 19:
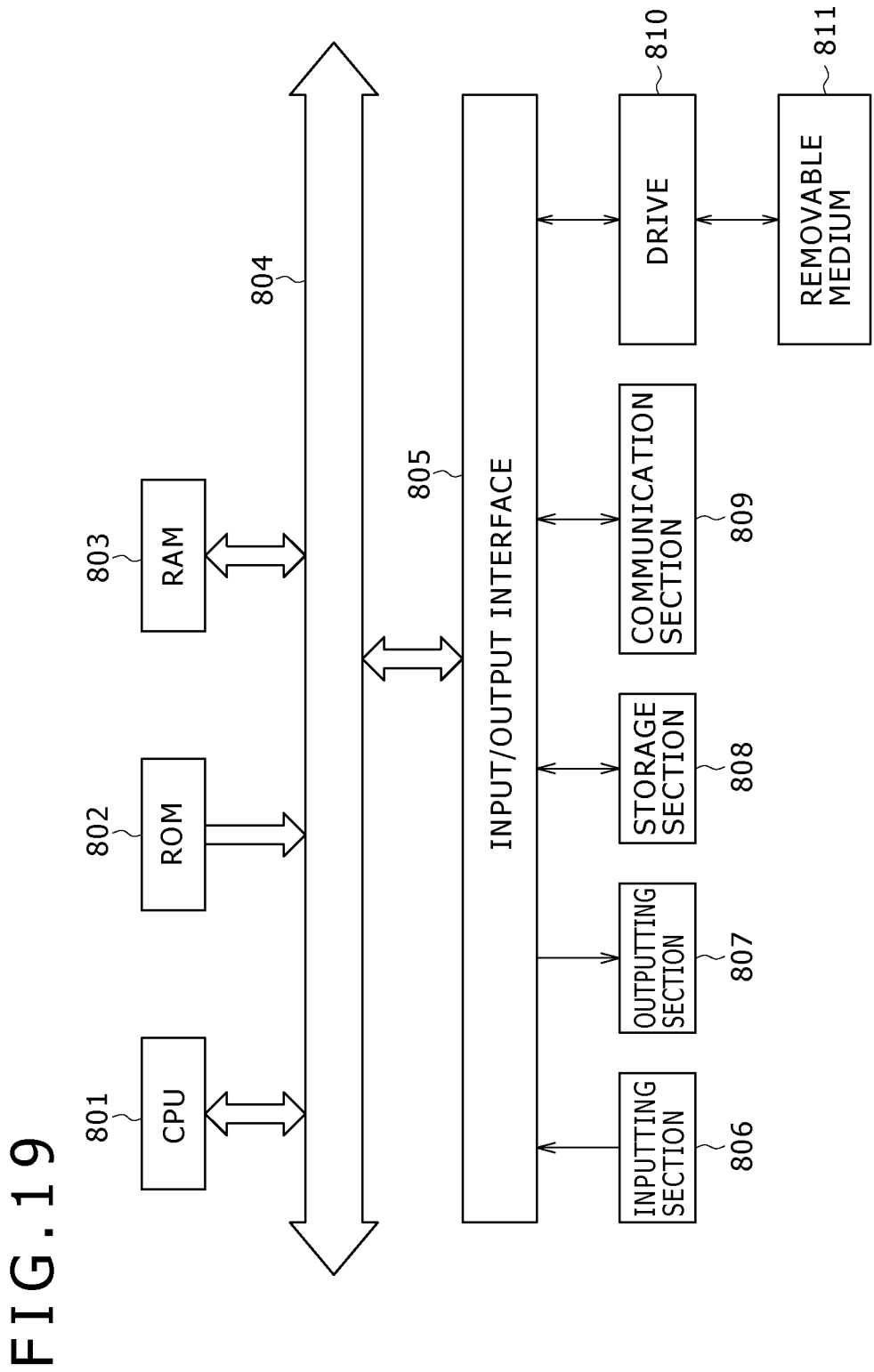
FIG. 19 depicts a block diagram showing one configuration of hardware of an information processing apparatus which is consistent with the present invention.

Referring to FIG. 19, a central processing unit (CPU) 801 executes various processes in accordance with a program stored in a ROM (Read Only Memory) 802. Further, the CPU 801 executes various processes in accordance with a program loaded from a storage section 808 into a RAM (Random Access Memory) 803. Also data necessary for the CPU 801 to execute the processes are suitably stored into the RAM 803.

The CPU 801, ROM 802 and RAM 803 are connected to one another by a bus 804. Also an input/output interface 805 is connected to the bus 804.

An inputting section 806 including a keyboard, a mouse and so forth and an outputting section 807 including a display unit are connected to the input/output interface 805. Further, a storage section 808 formed from a hard disk or the like and a communication section 809 including a modem, a terminal adapter and so forth are connected to the input/output interface 805. The communication section 809 controls communication carried out with another apparatus not shown through a network including the Internet.

Further, as occasion demands, a drive 810 is connected to the input/output interface 805. A removable medium 811 formed from a magnetic disk, an optical disk, a magneto-optical disk, a semiconductor memory or the like is suitably loaded into the drive 810. Thus, a computer program read from the loaded medium is installed into the storage section 808 as occasion demands.

Where the series of processes is executed by software, a program which constructs the software is installed from a network or a recording medium into a computer incorporated in hardware for exclusive use or, for example, a personal computer for universal use which can execute various functions by installing various programs.

The recording medium which includes such a program as described above may be formed as the removable medium 811 which is a package medium and includes a magnetic disk including a floppy disk, an optical disc including a CD-ROM (Compact Disc-Read Only Memory) and a DVD (Digital Versatile Disc), or a magneto-optical disc including an MD (MiniDisc), or a semiconductor memory, which has the program recorded thereon or therein and is distributed to provide the program to a user separately from an apparatus main frame. Else, the recording medium is formed as the ROM 802 or a hard disk or the like included in the storage section 808, in which the program is recorded and which is provided to a user in a state wherein the ROM 802 or the hard disk is incorporated in advance in the apparatus main frame.

It is to be noted that, in the present specification, the steps which describe the program recorded in a recording medium may be but need not necessarily be processed in a time series in the order as described, and include processes which are executed in parallel or individually without being processed in a time series.

The present application contains subject matter related to that disclosed in Japanese Priority Patent Application JP 2009-231673 filed in the Japan Patent Office on Oct. 5, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A power receiving apparatus that receives power from a power transmitter wirelessly and inductively comprising:
   a resonance circuit including a first coil and having a resonant frequency for wirelessly receiving electrical energy by means of electromagnetic resonance coupling and generating an oscillating electromagnetic field around the first coil; and
   a power reception circuit, the power reception circuit including a second coil, a bridge rectification circuit coupled to the second coil, and a smoothing capacitor coupled to the bridge rectification circuit, the second coil being electrically between the resonance circuit and the bridge rectification circuit, and the second coil being inductively coupled to the resonance circuit to wirelessly receive the electrical energy from the resonance circuit by means of inductance of the oscillating electromagnetic filed around the first coil,
   wherein,
      the resonance circuit is disposed in a first housing,
      the power reception circuit is disposed in a second housing,
      the first and second housings are physically separate from each other,
      the first coil has a diameter of about 0.44 m,
      the second coil has a diameter of 0.44 m or less, and
      the resonant frequency of the second resonance circuit is 13.56 MHz or 120 KHz.

2. The power reception apparatus of claim 1, wherein the first housing is made of a material having a low dielectric constant.

3. The power reception apparatus of claim 2, wherein the material is a plastic material.

4. A power transmission system comprising:
   (a) a power transmission apparatus including a first resonance circuit; and
   (b) a power receiving apparatus that wirelessly and inductively receives power from the power transmission apparatus and includes (1) a second resonance circuit, and (2) a power reception circuit,
   wherein,
      in the power transmission apparatus, the first resonance circuit includes a first coil and has a first resonant frequency for wirelessly transmitting electrical energy to the second resonance circuit, and in the power receiving apparatus,
  (i) the second resonance circuit includes a second coil and has a second resonant frequency for wirelessly receiving the electrical energy from the first resonance circuit by means of electromagnetic resonance coupling and generating an oscillating electromagnetic field around the second coil,
  (ii) the power reception circuit includes a third coil, a bridge rectification circuit coupled to the third coil, and a smoothing capacitor coupled to the bridge rectification circuit, the third coil being electrically between the second resonance circuit and the bridge rectification circuit, and the third coil being inductively coupled to the second resonance circuit to wirelessly receive the electrical energy from the second resonance circuit by means of inductance of the oscillating electromagnetic filed around the second coil,
  (iii) the second resonance circuit is disposed in a first housing,
  (iv) the power reception circuit is disposed in a second housing,
  (vi) the first and second housings are physically separate from each other,
  (vii) the second coil has a diameter of about 0.44 m,
  (viii) the third coil has a diameter of 0.44 m or less, and
  (ix) the resonant frequency of the second resonance circuit is 13.56 MHz or 120 KHz.

5. The power transmission system of claim 4, wherein the power transmission apparatus and the power receiving apparatus are physically spaced from each other by a given distance.

6. The power transmission system of claim 5, wherein the given distance between the power transmission apparatus and the power receiving apparatus is 2.2 m or less.

7. The power transmission system of claim 4, wherein the first housing is made of a material having a low dielectric constant.

8. The power transmission system of claim 7, wherein the material is a plastic material.

9. The power transmission system of claim 4, wherein the first resonant frequency and the second resonant frequency are equal to each other.

* * * * *